US012587742B2

(12) United States Patent
Nagami et al.

(10) Patent No.: US 12,587,742 B2
(45) Date of Patent: Mar. 24, 2026

(54) IMAGING APPARATUS, OPERATION METHOD OF IMAGING APPARATUS, AND OPERATION PROGRAM OF IMAGING APPARATUS

(71) Applicant: FUJIFILM Corporation, Tokyo (JP)

(72) Inventors: Ryosuke Nagami, Saitama (JP); Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 109 days.

(21) Appl. No.: 18/540,800

(22) Filed: Dec. 14, 2023

(65) Prior Publication Data

US 2024/0267622 A1      Aug. 8, 2024

(30) Foreign Application Priority Data

Feb. 8, 2023      (JP) ................................. 2023-017934

(51) Int. Cl.
| | |
|---|---|
| *H04N 23/67* | (2023.01) |
| *G02B 7/28* | (2021.01) |
| *H04N 23/63* | (2023.01) |
| *H04N 25/61* | (2023.01) |
| *H04N 25/78* | (2023.01) |

(52) U.S. Cl.
CPC ............. *H04N 23/675* (2023.01); *G02B 7/28* (2013.01); *H04N 23/63* (2023.01); *H04N 25/61* (2023.01); *H04N 25/78* (2023.01)

(58) Field of Classification Search
CPC .. H04N 23/673; H04N 23/672; H04N 23/631; H04N 25/78; H04N 25/61; H04N 23/63; H04N 23/675; H04N 5/3532; H04N 5/23212; H04N 2101/00; G02B 7/28; G03B 13/26
See application file for complete search history.

(56) References Cited

U.S. PATENT DOCUMENTS

| | | | |
|---|---|---|---|
| 2012/0194731 A1 | 8/2012 | Kimoto | |
| 2015/0042868 A1* | 2/2015 | Ono ......................... | G03B 3/10 |
| | | | 348/349 |
| 2020/0021756 A1* | 1/2020 | Kurahashi ............ | H04N 23/672 |

FOREIGN PATENT DOCUMENTS

| | | |
|---|---|---|
| JP | 2012159798 | 8/2012 |

* cited by examiner

*Primary Examiner* — Xi Wang
(74) *Attorney, Agent, or Firm* — JCIPRNET

(57) ABSTRACT
A focusing calculation includes two focusing calculation methods with different focusing performance and resistance to noise on a signal for calculation. A noise removal unit and a focusing calculation unit of a CPU select a focusing calculation method from among two focusing calculation methods based on a result of performing the focusing calculation at least once using any one of two focusing calculation methods, and perform the focusing calculation using the selected focusing calculation method. More specifically, in a case where a reliability degree of the focusing calculation using any one of two focusing calculation methods is high, the one focusing calculation method is selected. On the contrary, in a case where the reliability degree of the focusing calculation using any one of two focusing calculation methods is low, the other focusing calculation method is selected.

15 Claims, 18 Drawing Sheets

45
46
47
41N
48N
SIGNAL FOR IMAGE GENERATION 45
46
47
411P
49
481P
SIGNAL FOR FIRST CALCULATION

FIG. 13

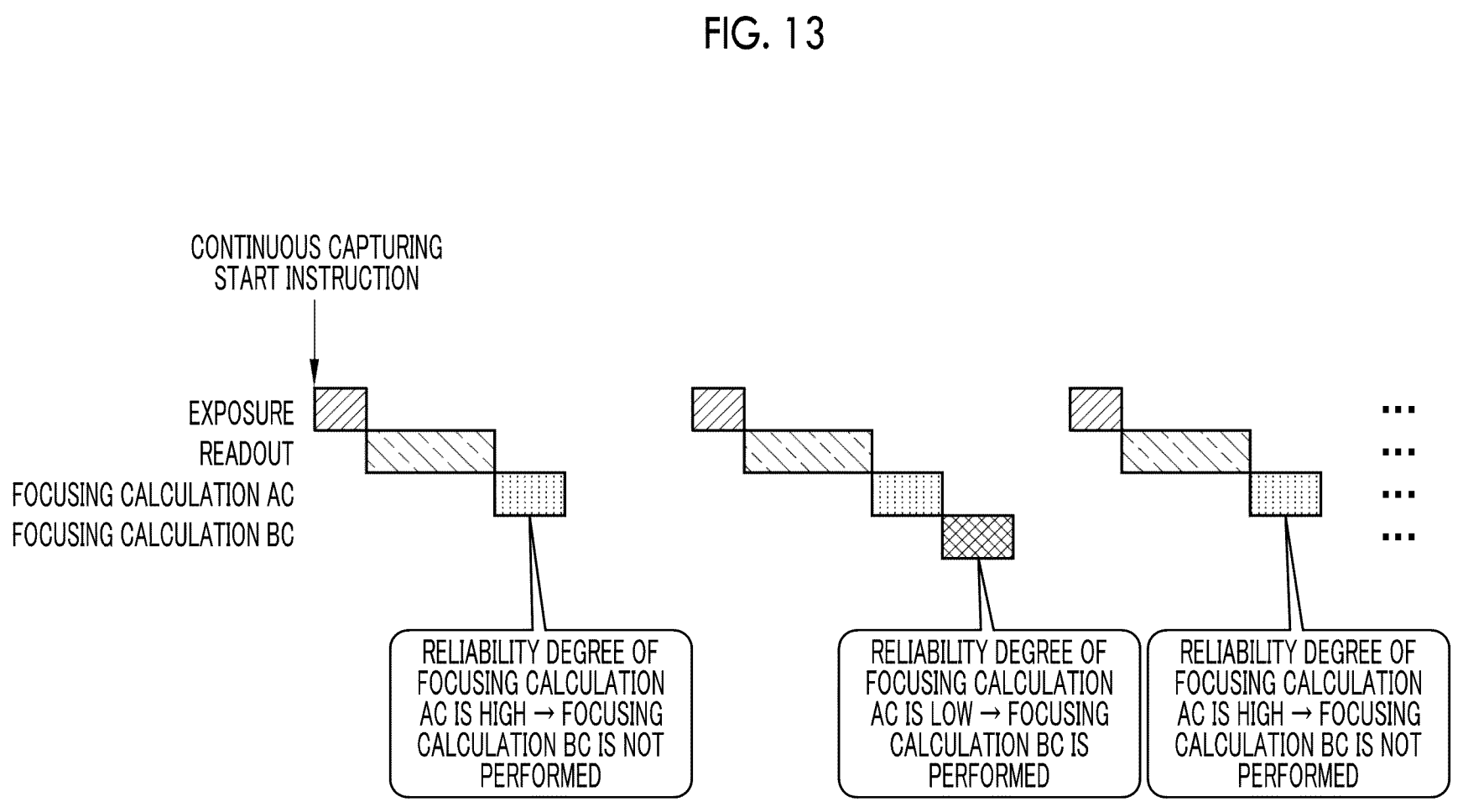

CONTINUOUS CAPTURING START INSTRUCTION

EXPOSURE
READOUT
FOCUSING CALCULATION AC
FOCUSING CALCULATION BC

RELIABILITY DEGREE OF FOCUSING CALCULATION AC IS HIGH → FOCUSING CALCULATION BC IS NOT PERFORMED

RELIABILITY DEGREE OF FOCUSING CALCULATION AC IS LOW → FOCUSING CALCULATION BC IS PERFORMED

RELIABILITY DEGREE OF FOCUSING CALCULATION AC IS HIGH → FOCUSING CALCULATION BC IS NOT PERFORMED

FIG. 21

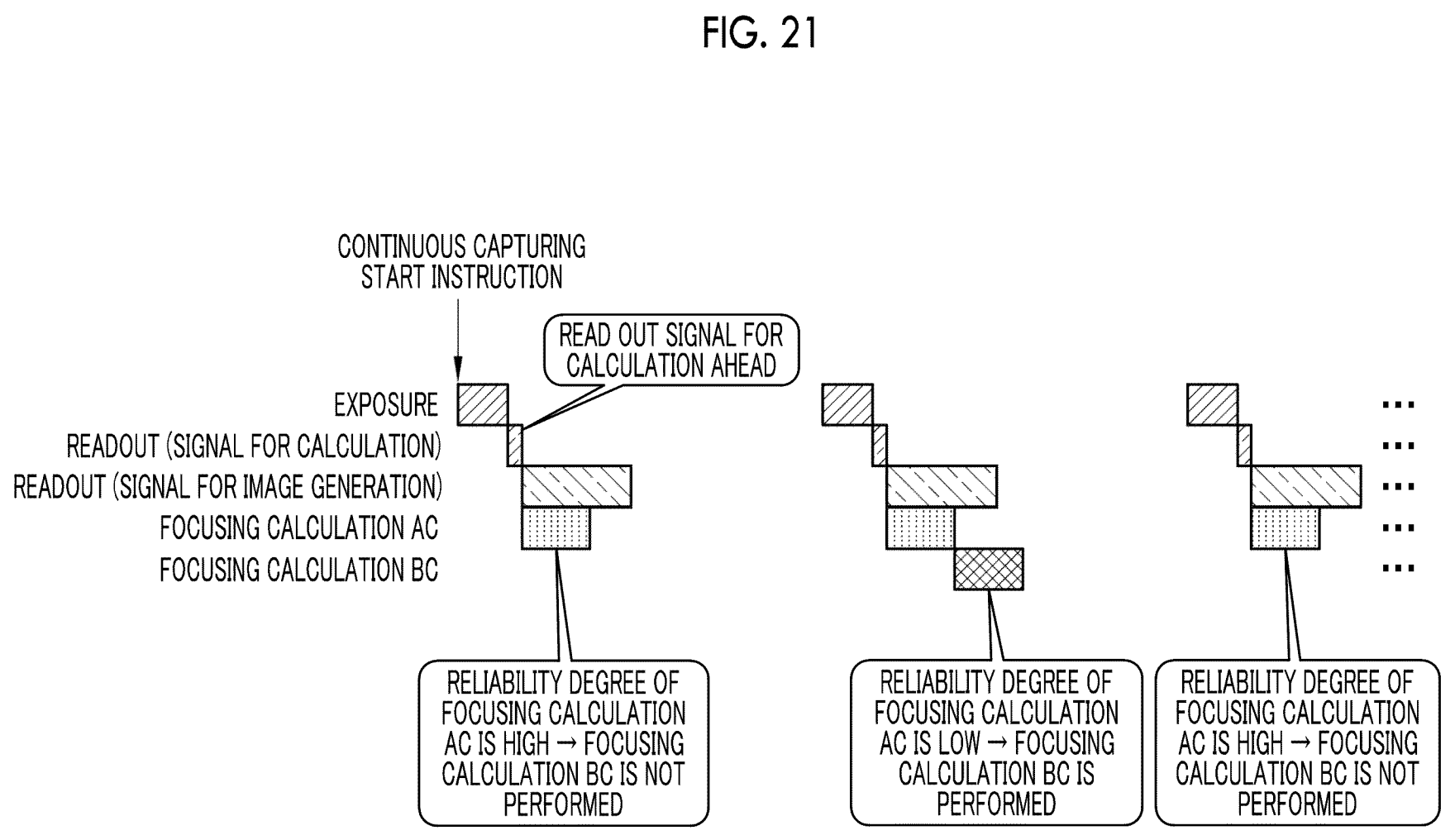

CONTINUOUS CAPTURING
START INSTRUCTION

READ OUT SIGNAL FOR
CALCULATION AHEAD

EXPOSURE

READOUT (SIGNAL FOR CALCULATION)

READOUT (SIGNAL FOR IMAGE GENERATION)

FOCUSING CALCULATION AC

FOCUSING CALCULATION BC

RELIABILITY DEGREE OF
FOCUSING CALCULATION
AC IS HIGH → FOCUSING
CALCULATION BC IS NOT
PERFORMED

RELIABILITY DEGREE OF
FOCUSING CALCULATION
AC IS LOW → FOCUSING
CALCULATION BC IS
PERFORMED

RELIABILITY DEGREE OF
FOCUSING CALCULATION
AC IS HIGH → FOCUSING
CALCULATION BC IS NOT
PERFORMED

| SETTING INFORMATION | | |
| --- | --- | --- |
| | REGION SIZE | FREQUENCY PARAMETER |
| FOCUSING CALCULATION METHOD D | 1/16 | F1 |
| FOCUSING CALCULATION METHOD E | 1/9 | F3 ($<$ F1) |
| FOCUSING CALCULATION METHOD F | 1/4 | F4 ($<$ F3) |

| SETTING INFORMATION | | | |
| --- | --- | --- | --- |
| | REGION SIZE | FREQUENCY PARAMETER | PIXEL MIXING |
| FOCUSING CALCULATION METHOD G | 1/16 | F1 | NONE |
| FOCUSING CALCULATION METHOD H | 1/9 | F3 ($<$ F1) | 2 × 2 |
| FOCUSING CALCULATION METHOD I | 1/4 | F4 ($<$ F3) | 3 × 3 |

FIG. 24

IMAGING APPARATUS, OPERATION METHOD OF IMAGING APPARATUS, AND OPERATION PROGRAM OF IMAGING APPARATUS

CROSS-REFERENCE TO RELATED APPLICATIONS

The present application claims priority under 35 U.S.C. § 119 to Japanese Patent Application No. 2023-017934 filed on Feb. 8, 2023. The above application is hereby expressly incorporated by reference, in its entirety, into the present application.

BACKGROUND

1. Technical Field

A technique of the present disclosure relates to an imaging apparatus, an operation method of an imaging apparatus, and an operation program of an imaging apparatus.

2. Description of the Related Art

JP2012-159798A discloses an imaging apparatus that controls a position of a focus lens based on an imaging signal acquired by an imaging unit that images a subject. The imaging apparatus disclosed in JP2012-159798A comprises a focus evaluation value calculation unit, a first focusing degree calculation unit, a second focusing degree calculation unit, an exposure condition detection unit, a focusing degree selection unit, and a focus lens control setting unit. The focus evaluation value calculation unit calculates a focus evaluation value indicating a contrast of the imaging signal by using a signal of a specific region of the imaging signal. The first focusing degree calculation unit uses the focus evaluation value to calculate a first focusing degree indicating a focusing degree. The second focusing degree calculation unit uses the focus evaluation value to calculate a second focusing degree indicating a focusing degree different from the first focusing degree. The exposure condition detection unit detects an exposure condition in a case of the subject imaging. The focusing degree selection unit selects the focusing degree using the first focusing degree, the second focusing degree, and the exposure condition detected by the exposure condition detection unit. The focus lens control setting unit decides a drive condition of the focus lens using the focusing degree selected by the focusing degree selection unit.

SUMMARY

One embodiment according to the technique of the present disclosure provides an imaging apparatus capable of selecting a more practical focusing calculation method.

An imaging apparatus according to an aspect of the present disclosure is an imaging apparatus having an automatic focus adjustment function of performing a focusing calculation of calculating a focusing position of a focus lens based on a signal for calculation read out from an imaging element, in which the focusing calculation includes a plurality of focusing calculation methods with different focusing performance and resistance to noise on the signal for calculation, the imaging apparatus including a processor. The processor is configured to select a focusing calculation method from among the plurality of focusing calculation methods based on a result of performing the focusing calculation at least once using a first focusing calculation method which is one of the plurality of focusing calculation methods, and perform the focusing calculation using the selected focusing calculation method.

It is preferable that the first focusing calculation method is a method with the focusing performance higher than a first threshold value among the plurality of focusing calculation methods.

It is preferable that the first focusing calculation method is a method with highest focusing performance among the plurality of focusing calculation methods.

It is preferable that the processor is configured to, in a case where a reliability degree of the focusing calculation by the first focusing calculation method is lower than a second threshold value, perform processing at least once of performing the focusing calculation using a second focusing calculation method with the resistance stronger than the first focusing calculation method.

It is preferable that the second focusing calculation method has the focusing performance lower than the first focusing calculation method.

It is preferable that the processor is configured to use a result of the focusing calculation by the first focusing calculation method for the focusing calculation by the second focusing calculation method.

It is preferable that a determination section is included in which the focusing calculation by the plurality of focusing calculation methods is performed to determine the focusing calculation method with a relatively high reliability degree of the focusing calculation and the processor is configured to select the focusing calculation method determined to have the relatively high reliability degree in the determination section.

It is preferable that the determination section is an imaging section of a live view image.

It is preferable that the determination section includes a fixed section starting from at least a start point in time of main imaging.

It is preferable that sizes of regions, which are in the imaging element and where the signal for calculation used for the focusing calculation is acquired, are different between the plurality of focusing calculation methods.

It is preferable that the focusing calculation method with a larger size of the region has stronger resistance to noise.

It is preferable that frequency parameters in noise removal processing performed on the signal for calculation are different between the plurality of focusing calculation methods.

It is preferable that the focusing calculation method with a lower frequency parameter has stronger resistance to noise.

It is preferable that the imaging element reads out the signal for calculation prior to a signal for image generation used for generating an image.

An operation method of an imaging apparatus according to an aspect of the present disclosure is an operation method of an imaging apparatus having an automatic focus adjustment function of performing a focusing calculation of calculating a focusing position of a focus lens based on a signal for calculation read out from an imaging element, in which the focusing calculation includes a plurality of focusing calculation methods with different focusing performance and resistance to noise on the signal for calculation, the operation method including selecting a focusing calculation method from among the plurality of focusing calculation methods based on a result of performing the focusing calculation at least once using a first focusing calculation method which is one of the plurality of focusing calculation methods, and performing the focusing calculation using the selected focusing calculation method.

An operation program of an imaging apparatus according to an aspect of the present disclosure is an operation program of an imaging apparatus having an automatic focus adjustment function of performing a focusing calculation of calculating a focusing position of a focus lens based on a signal for calculation read out from an imaging element, in which the focusing calculation includes a plurality of focusing calculation methods with different focusing performance and resistance to noise on the signal for calculation, the operation program causing a computer to execute a process including selecting a focusing calculation method from among the plurality of focusing calculation methods based on a result of performing the focusing calculation at least once using a first focusing calculation method which is one of the plurality of focusing calculation methods, and performing the focusing calculation using the selected focusing calculation method.

BRIEF DESCRIPTION OF THE DRAWINGS

Exemplary embodiments according to the technique of the present disclosure will be described in detail based on the following figures, wherein:

FIG. 13 is a diagram showing a flow of exposure, readout, focusing calculation AC, and focusing calculation BC during continuous capturing;

FIG. 21 is a diagram showing a fourth embodiment in which the signal for calculation is read out ahead;

FIG. 22 is a diagram showing another example of the setting information;

FIG. 23 is a diagram showing still another example of the setting information; and FIG. 24 is a diagram showing a flow of exposure, readout, focusing calculation AC, and focusing calculation BC during video imaging.

DETAILED DESCRIPTION

First Embodiment

Figure 1:
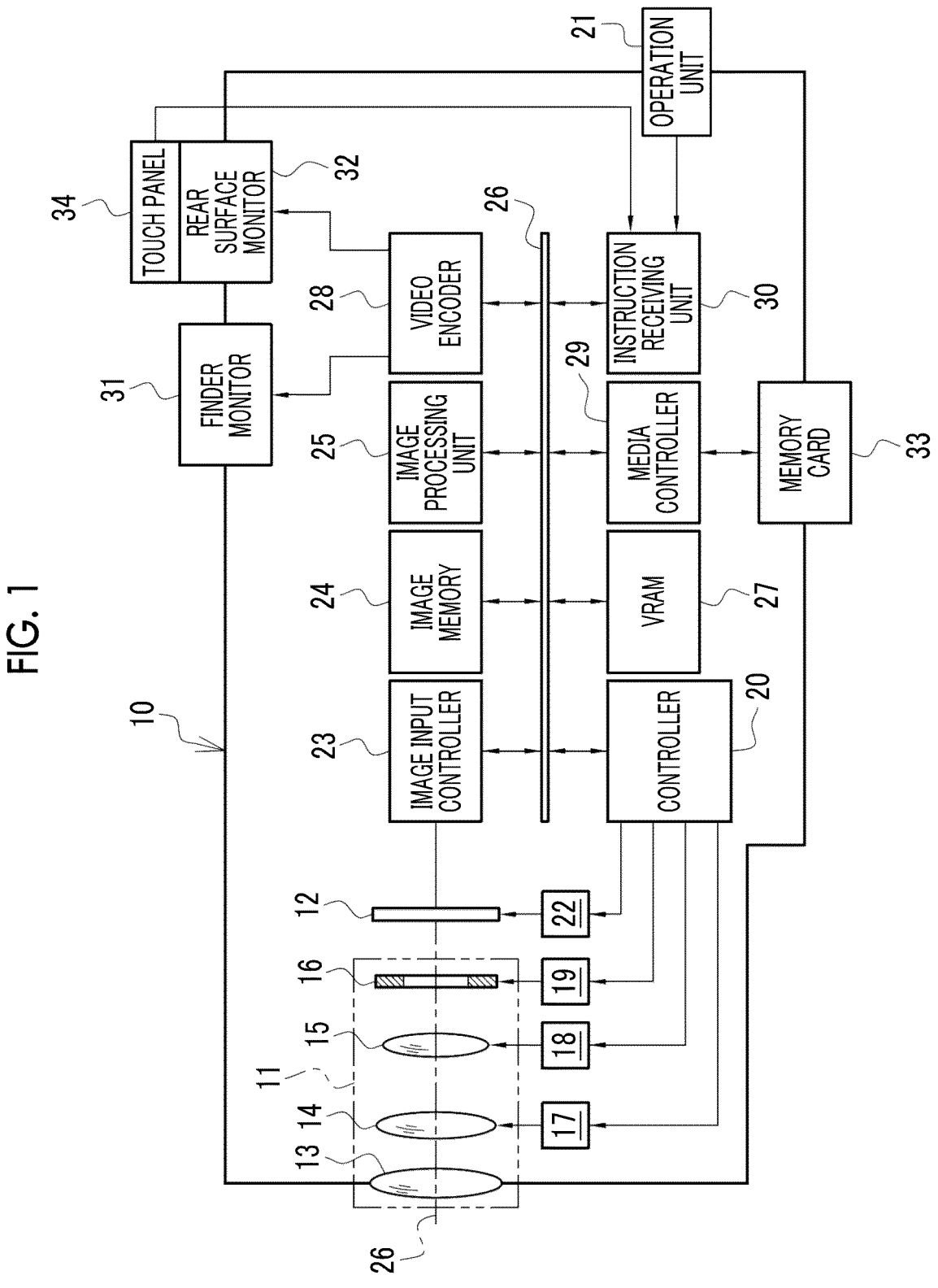
FIG. 1 is a diagram showing a configuration of an imaging apparatus.

As shown in FIG. 1 as an example, an imaging apparatus 10 is, for example, a mirrorless single-lens digital camera, and comprises an imaging optical system 11 and an imaging element 12. The imaging optical system 11 has a plurality of types of lenses for forming an image of subject light on the imaging element 12. Specifically, the imaging optical system 11 has an objective lens 13, a focus lens 14, and a zoom lens 15. Each of these lenses 13 to 15 is disposed in this order from an object side (subject side) toward an image-forming side (imaging element 12 side). Although simplified in FIG. 1, each of the lenses 13 to 15 is actually a lens group in which a plurality of lenses are combined. The imaging optical system 11 also has a stop 16. The stop 16 is disposed closest to the image-forming side in the imaging optical system 11. The imaging apparatus 10 may be a type in which a lens barrel with built-in the imaging optical system 11 and the like is integrated with a main body with built-in the imaging element 12 and the like, or may be a so-called lens interchangeable type in which the lens barrel and the main body are separate bodies.

The focus lens 14 is provided with a focus lens driving mechanism 17, the zoom lens 15 is provided with a zoom lens driving mechanism 18, and the stop 16 is provided with a stop driving mechanism 19. The focus lens driving mechanism 17 holds the focus lens 14, and includes a cam ring for focusing in which a cam groove is formed on the outer periphery of the focus lens 14, a motor for focusing that rotates the cam ring for focusing around an optical axis OA to move the cam ring for focusing along the optical axis OA, a driver of the motor for focusing, and the like. Similarly, the zoom lens driving mechanism 18 holds the zoom lens 15, and includes a cam ring for zoom in which a cam groove is formed on the outer periphery of the zoom lens 15, a motor for zoom that rotates the cam ring for zoom around the optical axis OA to move the cam ring for zoom along the optical axis OA, a driver of the motor for zoom, and the like. The stop driving mechanism 19 includes a motor for stop that opens and closes a plurality of stop leaf blades of the stop 16, a driver of the motor for stop, and the like.

The motor for focusing, the motor for zoom, and the motor for stop are, for example, stepping motors. In this case, positions of the focus lens 14 and the zoom lens 15 on the optical axis OA and an opening degree of the stop 16 can be derived from drive amounts of the motor for focusing, the motor for zoom, and the motor for stop. A position sensor may be provided to detect the positions of the focus lens 14 and the zoom lens 15, instead of the drive amounts of the motor for focusing and the motor for zoom.

An electric component, such as the motor or the driver, of each of the driving mechanisms 17 to 19 is connected to a controller 20. The electric component of each of the driving mechanisms 17 to 19 is driven under the control of the controller 20. More specifically, the controller 20 issues a drive signal in response to an instruction from a user, which is input via an operation unit 21, to drive the electric component of each of the driving mechanisms 17 to 19. For example, in a case where an instruction to change an angle of view to a telephoto side is input via an angle-of-view change switch of the operation unit 21, the controller 20 issues, to the driver of the motor for zoom of the zoom lens driving mechanism 18, the drive signal to move the zoom lens 15 to the telephoto side.

The motor for focusing, the motor for zoom, and the motor for stop output the drive amounts to the controller 20. The controller 20 derives, from the drive amounts, the positions of the focus lens 14 and the zoom lens 15 on the optical axis OA and the opening degree of the stop 16.

The imaging element 12 is, for example, a complementary metal-oxide-semiconductor (CMOS) image sensor, and has an imaging surface 42 (refer to FIG. 2) that images the subject light. The imaging element 12 is disposed such that a center of the imaging surface 42 matches the optical axis OA and the imaging surface 42 is orthogonal to the optical axis OA. The terms "match" and "orthogonal" as used herein mean not only perfect match and orthogonality but also match and orthogonality in a sense including an error generally allowed in the technical field to which the technique of the present disclosure belongs.

An imaging element driver 22 is connected to the imaging element 12. The imaging element driver 22 is connected to the controller 20. The imaging element driver 22 performs, under the control of the controller 20, supplying of a vertical scanning signal and a horizontal scanning signal to the imaging element 12, or the like to control an imaging timing of the subject light by the imaging element 12.

The controller 20 is connected to each unit such as an image input controller 23, an image memory 24, and an image processing unit 25, through a busline 26. In addition, the busline 26 is connected to a video random access memory (VRAM) 27, a video encoder 28, a media controller 29, an instruction receiving unit 30, and the like. Although not shown, the busline 26 is also connected to a strobe driving controller that controls the drive of a strobe device, an external communication interface (I/F) for communicating with an external device via a connection terminal such as a universal serial bus (USB) terminal or a wireless communication I/F, and the like.

Image data obtained by imaging the subject light is input to the image input controller 23 from the imaging element 12. The image input controller 23 outputs the image data to the image memory 24. The image memory 24 is, for example, a synchronous dynamic random access memory (SDRAM), and temporarily stores the image data.

The image processing unit 25 reads out unprocessed image data from the image memory 24. The image processing unit 25 performs various types of image processing on the image data. The various types of image processing are, for example, offset correction processing, sensitivity correction processing, pixel interpolation processing, white balance correction processing, gamma correction processing, demosaicing, brightness signal and color difference signal generation processing, contour enhancement processing, and color correction processing. The image processing unit 25 writes the image data subjected to the various types of image processing back to the image memory 24.

The image data that is subjected to the various types of image processing and is displayed as a live view image (also referred to as through-image) is input into the VRAM 27 from the image memory 24. The VRAM 27 has a region in which the image data for two consecutive frames is stored. The image data stored in the VRAM 27 is sequentially rewritten to new image data. The VRAM 27 sequentially outputs, to the video encoder 28, newer image data of the image data for two consecutive frames.

The video encoder 28 converts the image data from the VRAM 27 into video data, and outputs the video data to any one of a finder monitor 31 or a rear surface monitor 32. Accordingly, the user can visually recognize the live view image through any one of the finder monitor 31 or the rear surface monitor 32. A display frame rate of the live view image is, for example, 60 frames per second (fps). Which one of the finder monitor 31 and the rear surface monitor 32 the video data is output to is decided as follows, for example. That is, a pupil detection sensor is provided in a finder. In a case where the pupil detection sensor detects that the user looks into the finder, the video data is output to the finder monitor 31. On the contrary, in a case where the pupil detection sensor detects that the user does not look into the finder, the video data is output to the rear surface monitor 32.

In a case where an instruction to start capturing a static image or a video is issued via a release button of the operation unit 21, the image processing unit 25 performs compression processing on the image data of the image memory 24. In a case of the static image, the image processing unit 25 performs, for example, the compression processing of a joint photographic experts group (JPEG) format on the image data. In a case of the video, the image processing unit 25 performs, for example, the compression processing of a moving picture experts group (MPEG) format on the image data. The image processing unit 25 outputs, to the media controller 29, the image data subjected to the compression processing.

The media controller 29 records, in a memory card 33, the image data subjected to the compression processing from the image processing unit 25. The memory card 33 is attachably and detachably mounted in a memory card slot (not illustrated).

In a case where an image playback mode is selected via a mode selector switch of the operation unit 21, the media controller 29 reads out the image data from the memory card 33 to output the image data to the image processing unit 25. The image processing unit 25 performs expansion processing on image data from the memory card 33. The image data after the expansion processing is output to the video encoder 28. The video encoder 28 converts the image data into the video data and outputs the video data to the rear surface monitor 32. Accordingly, the user can visually recognize a reproduction image through the rear surface monitor 32.

The instruction receiving unit 30 receives various operation instructions input from the user via a touch panel 34 that is integrally provided with the operation unit 21 and the rear surface monitor 32. The instruction receiving unit 30 outputs the received various operation instructions to the controller 20 through the busline 26.

As described above, the operation unit 21 includes the angle-of-view change switch, the release button, and the mode selector switch. In addition to these switches, the operation unit 21 further includes a menu button for displaying various setting menus on the rear surface monitor 32, a cross key used for numerical value setting, switching of options, and the like, and a confirmation button that is operated in a case of setting confirmation and the like. The touch panel 34 is superimposed on a display surface of the rear surface monitor 32. The touch panel 34 detects contact with a finger of the user or a dedicated indicator such as a stylus pen to recognize the various operation instructions from the user.

The modes that can be switched by the mode selector switch include a static-image capturing mode, a video imaging mode, an image playback mode, a setting mode, and the like. The static-image capturing mode includes not only a normal capturing mode in which one static image is captured but also a continuous capturing mode in which static images are continuously captured at a predetermined capturing interval (for example, frame rate of 5 fps to 10 fps). The continuous capturing mode is activated, for example, in a case where a full push state of the release button continues for a predetermined time or longer (for example, one second or longer). The continuous capturing mode ends in a case where the full push state of the release button is released.

Figure 2:
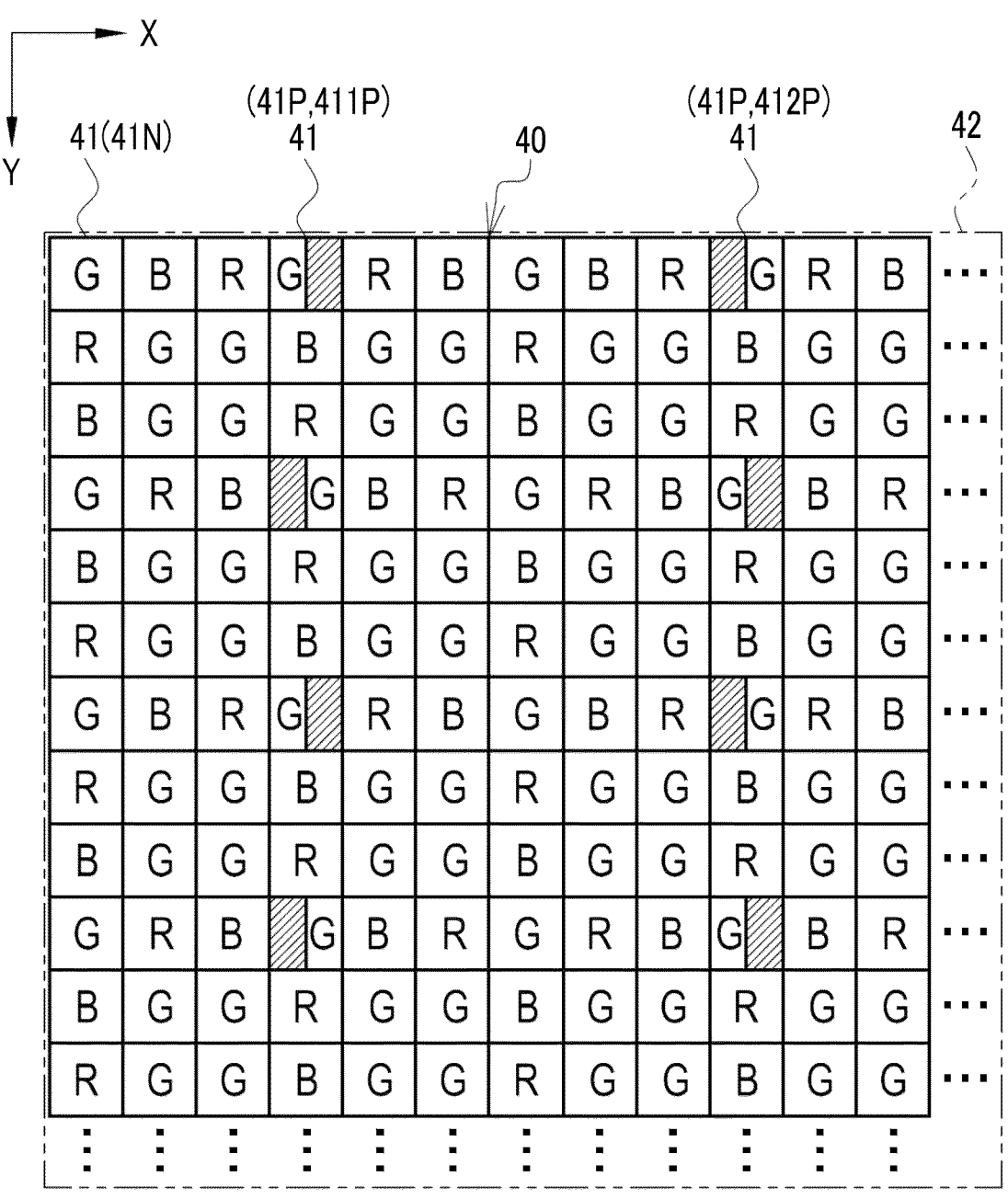
FIG. 2 is a diagram showing an arrangement of pixels of the imaging element.

As shown in FIG. 2 as an example, the imaging element 12 is provided with a photoelectric conversion unit 40. The photoelectric conversion unit 40 is configured of a plurality of pixels 41 two-dimensionally arranged along an X direction and a Y direction. The plurality of pixels 41 form the imaging surface 42. As is well known, the pixel 41 is configured of a micro lens 45, a color filter 46, and a photoelectric conversion element 47 such as a photodiode (refer to FIGS. 3 to 5 for all). The X direction and the Y direction are a horizontal direction and a vertical direction in a state where a bottom surface of the imaging apparatus 10 is placed on a horizontal plane.

Scanning lines parallel to the X direction are wired between rows of the pixels 41. Further, signal lines parallel to the Y direction are wired between columns of the pixels 41. (The photoelectric conversion element 47 of) the pixel 41 is connected to the signal line via an amplifier and a switch. The scanning line is also connected to the switch. In a case where a signal charge corresponding to the subject light is accumulated in (the photoelectric conversion element 47 of) the pixel 41, an off signal is supplied as the vertical scanning signal through the scanning line to turn off the switch. In a case where a voltage signal corresponding to the signal charge is read out from (the photoelectric conversion element 47 of) the pixel 41, an on signal is supplied as the vertical scanning signal through the scanning line to turn on the switch. An end of the signal line is connected to a correlated double sampling (CDS) circuit and an analog to digital converter (ADC) circuit. The CDS circuit performs sampling two correlation pile on the voltage signal input through the signal line. The ADC circuit converts the voltage signal subjected to the sampling two correlation pile into a digital voltage signal.

The pixels 41 are divided, depending on types of the color filter 46, into three types of a green pixel (denoted as "G" in FIG. 2) having sensitivity to light in a green wavelength range, a red pixel (denoted as "R" in FIG. 2) having sensitivity to light in a red wavelength range, and a blue pixel (denoted as "B" in FIG. 2) having sensitivity to light in a blue wavelength range. The three types of the pixels 41 are regularly arranged in a predetermined array. As the predetermined array, a so-called Bayer array is exemplified in which two green pixels, one blue pixel, and one red pixel are arranged in vertical and horizontal 2×2 pixels.

The pixel 41 includes a normal pixel 41N and a phase difference detection pixel 41P. The phase difference detection pixel 41P further includes a first phase difference detection pixel 411P and a second phase difference detection pixel 412P. The normal pixel 41N has three types of pixels of the green pixel, the blue pixel, and the red pixel, but the phase difference detection pixel 41P has only the green pixel.

The phase difference detection pixels 41P are arranged at predetermined spacings in the X direction and the Y direction. In FIG. 2, the phase difference detection pixels 41P are arranged at a spacing of five pixels in the X direction and at a spacing of two pixels in the Y direction. Further, the phase difference detection pixels 41P are arranged such that the first phase difference detection pixels 411P and the second phase difference detection pixels 412P alternately appear in the X direction and the Y direction. For example, in a case where a fourth row is viewed, the phase difference detection pixels 41P are arranged in an order, from left to right, of the second phase difference detection pixel 412P, the first phase difference detection pixel 411P, and the like. Further, for example, in a case where a tenth column is viewed, the phase difference detection pixels 41P are arranged in an order, from top to bottom, of the second phase difference detection pixel 412P, the first phase difference detection pixel 411P, the second phase difference detection pixel 412P, the first phase difference detection pixel 411P, and the like. The first phase difference detection pixel 411P and the second phase difference detection pixel 412P adjacent to each other in the X direction and the Y direction configure one set for detecting a phase difference α (refer to FIG. 6).

Figure 3:
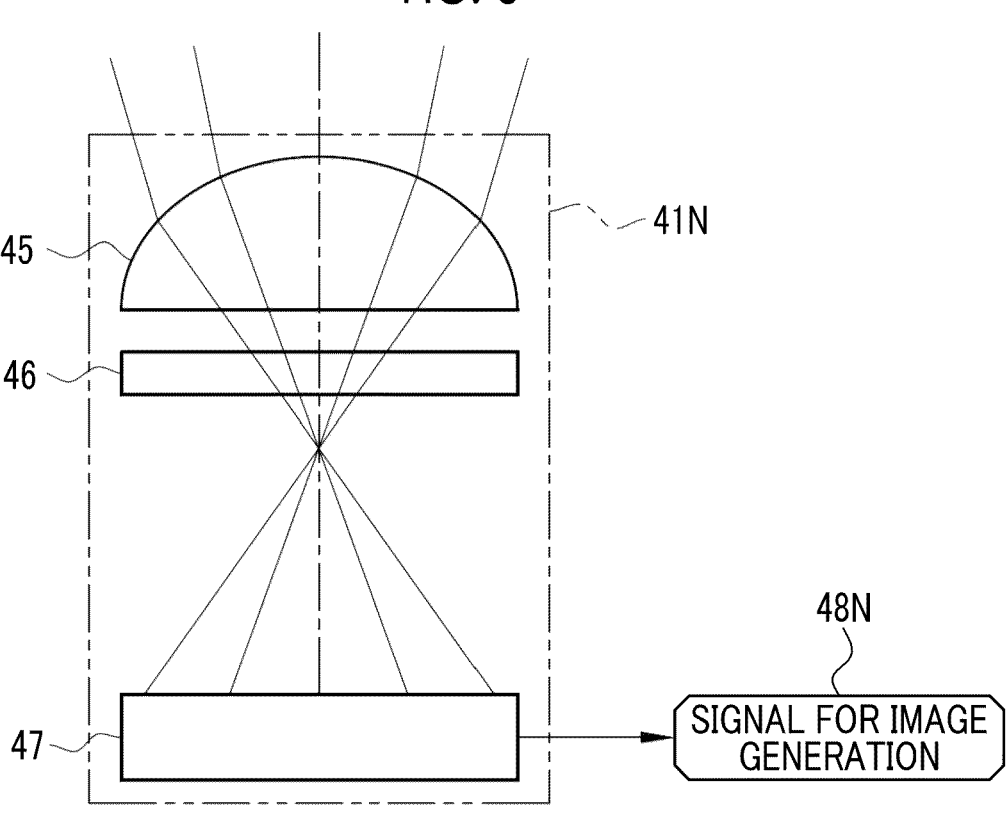
FIG. 3 is a diagram showing a configuration of a normal pixel.
Figure 4:
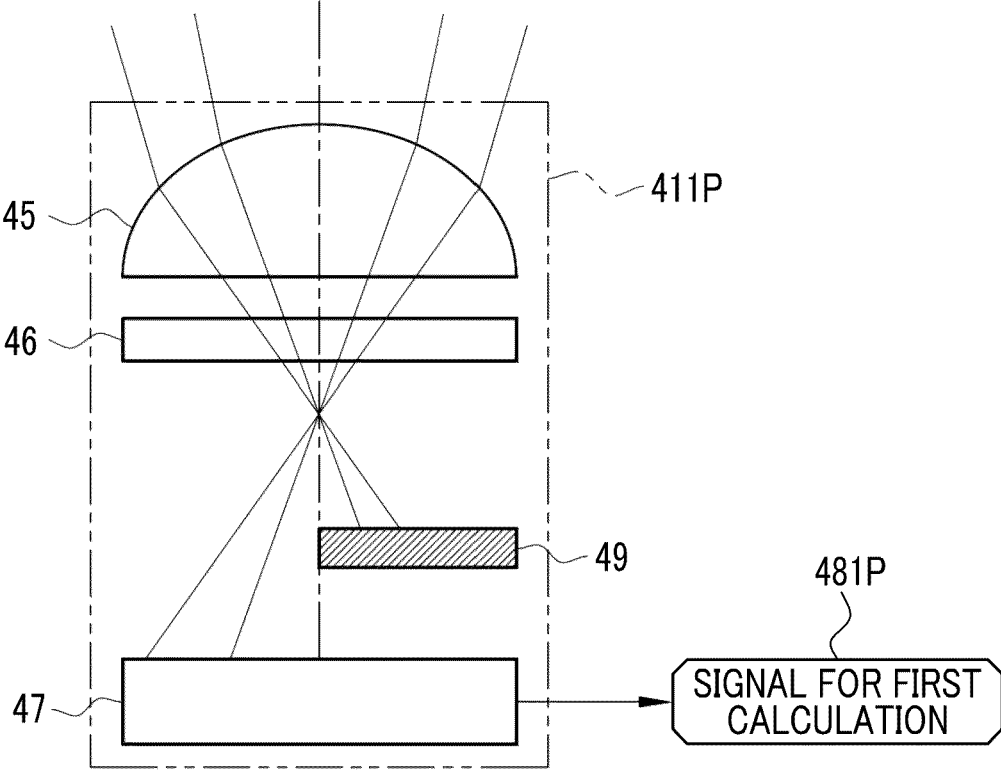
FIG. 4 is a diagram showing a configuration of a first phase difference detection pixel.
Figure 5:
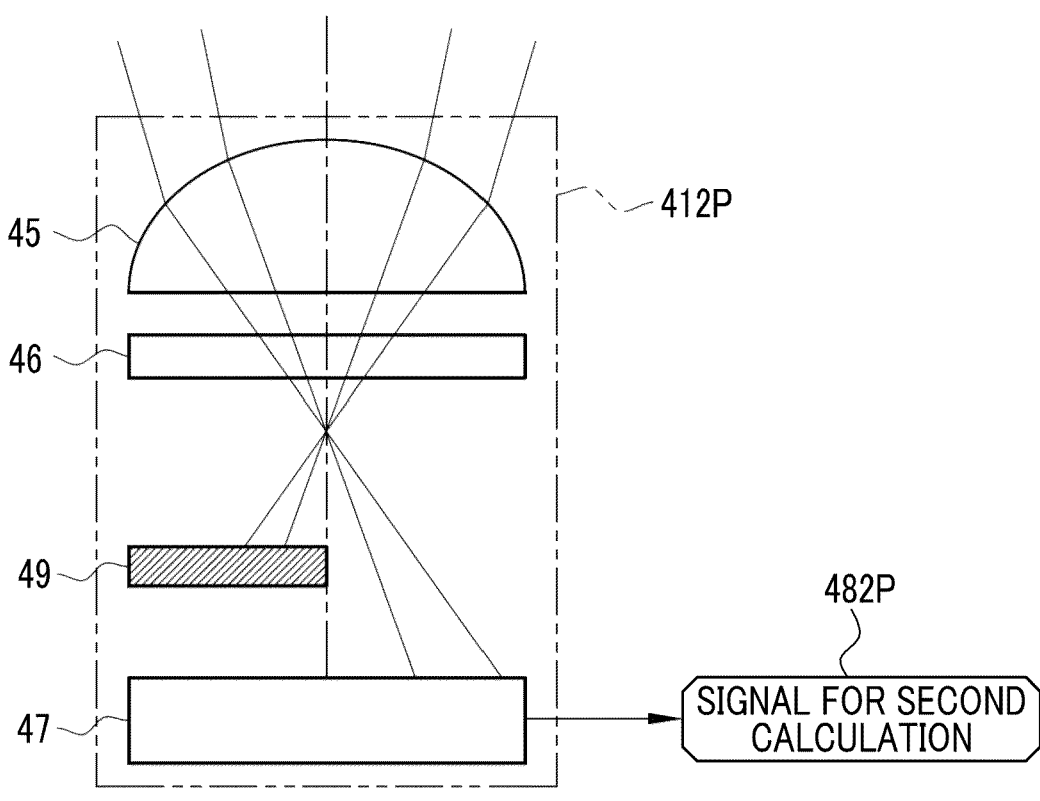
FIG. 5 is a diagram showing a configuration of a second phase difference detection pixel.

As shown in FIGS. 3 to 5 as an example, the normal pixel 41N, the first phase difference detection pixel 411P, and the second phase difference detection pixel 412P have the same basic configuration and are configured of the micro lens 45, the color filter 46, and the photoelectric conversion element 47, which are disposed in the order from the object side.

As shown in FIG. 3, the photoelectric conversion element 47 of the normal pixel 41N outputs, as the voltage signal, a signal for image generation 48N corresponding to the subject light that is condensed by the micro lens 45 and transmitted through the color filter 46. The signal for image generation 48N is stored in the image memory 24 as a part of the image data.

As shown in FIGS. 4 and 5, a light shielding member 49 is disposed between the color filter 46 and the photoelectric conversion element 47 for the first phase difference detection pixel 411P and the second phase difference detection pixel 412P. The light shielding member 49 is not disposed in the normal pixel 41N. The light shielding member 49 of the first phase difference detection pixel 411P shields a right half of the photoelectric conversion element 47 as viewed from the object side. On the contrary, the light shielding member 49 of the second phase difference detection pixel 412P shields a left half of the photoelectric conversion element 47 as viewed from the object side.

The photoelectric conversion element 47 of the first phase difference detection pixel 411P outputs, as the voltage signal, a signal for first calculation 481P corresponding to the subject light that is condensed by the micro lens 45 and transmitted through the color filter 46, and whose right half is shielded by the light shielding member 49. On the contrary, the photoelectric conversion element 47 of the second phase difference detection pixel 412P outputs, as the voltage signal, a signal for second calculation 482P corresponding to the subject light that is condensed by the micro lens 45 and transmitted through the color filter 46, and whose left half is shielded by the light shielding member 49. The signal for first calculation 481P and the signal for second calculation 482P are stored in the image memory 24 as a part of the image data, similarly to the signal for image generation 48N. The signal for first calculation 481P and the signal for second calculation 482P are examples of "signal for calculation read out from imaging element" according to the technique of the present disclosure. Hereinafter, in a case where the signals do not need to be particularly distinguished from each other, the signal for first calculation 481P and the signal for second calculation 482P are collectively denoted as a signal for calculation 48P.

Figure 6:
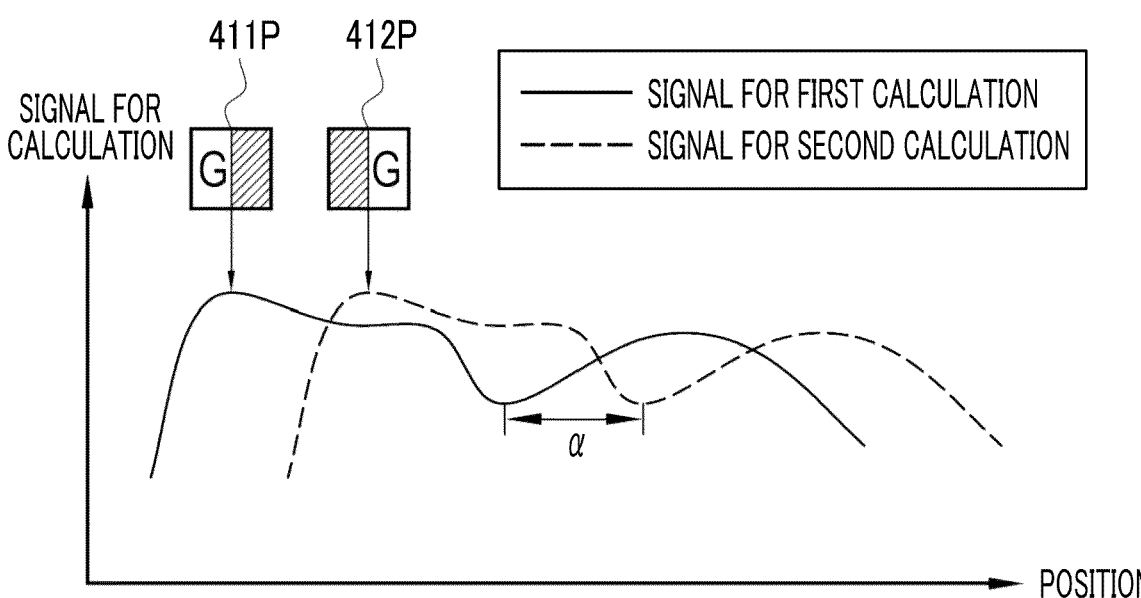
FIG. 6 is a graph showing a phase difference between a signal for first calculation and a signal for second calculation.

As shown in FIG. 6 as an example, the phase difference α appears between the signal for first calculation 481P and the signal for second calculation 482P, which are output from the first phase difference detection pixel 411P and the second phase difference detection pixel 412P adjacent to each other in the X direction and the Y direction. With the phase difference α, it is possible to know a movement direction and amount of the focus lens 14 to obtain a focusing position.

Figure 7:
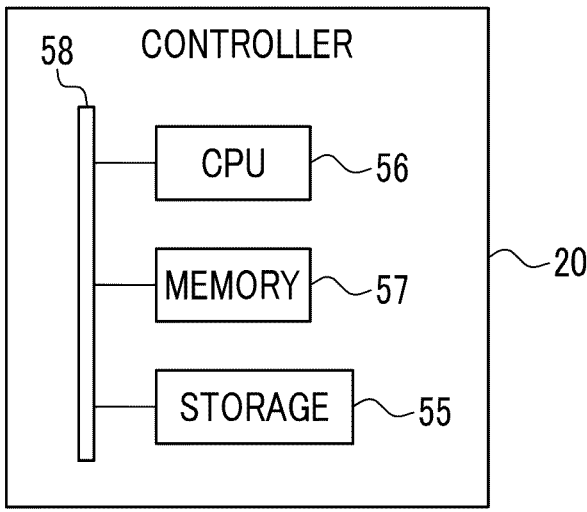
FIG. 7 is a diagram showing a detailed configuration of a controller.

As shown in FIG. 7 as an example, the controller 20 comprises a storage 55, a central processing unit (CPU) 56, and a memory 57. The storage 55, the CPU 56, and the memory 57 are connected to each other via a busline 58. The controller 20 is an example of "computer" according to the technique of the present disclosure. The CPU 56 is an example of "processor" according to the technique of the present disclosure.

The storage 55 is a non-volatile storage device such as an electrically erasable programmable read-only memory (EE-PROM). The storage 55 stores various programs, various types of data associated with the various programs, and the like. Instead of the EEPROM, a ferroelectric random access memory (FeRAM) or a magnetoresistive random access memory (MRAM) may be used as the storage 55.

The memory 57 is a work memory for the CPU 56 to execute the processing. The CPU 56 loads the program stored in the storage 55 into the memory 57 to execute the processing according to the program. With the above, the CPU 56 controls each unit of the imaging apparatus 10 in an integrated manner. The memory 57 may be built into the CPU 56.

Figure 8:
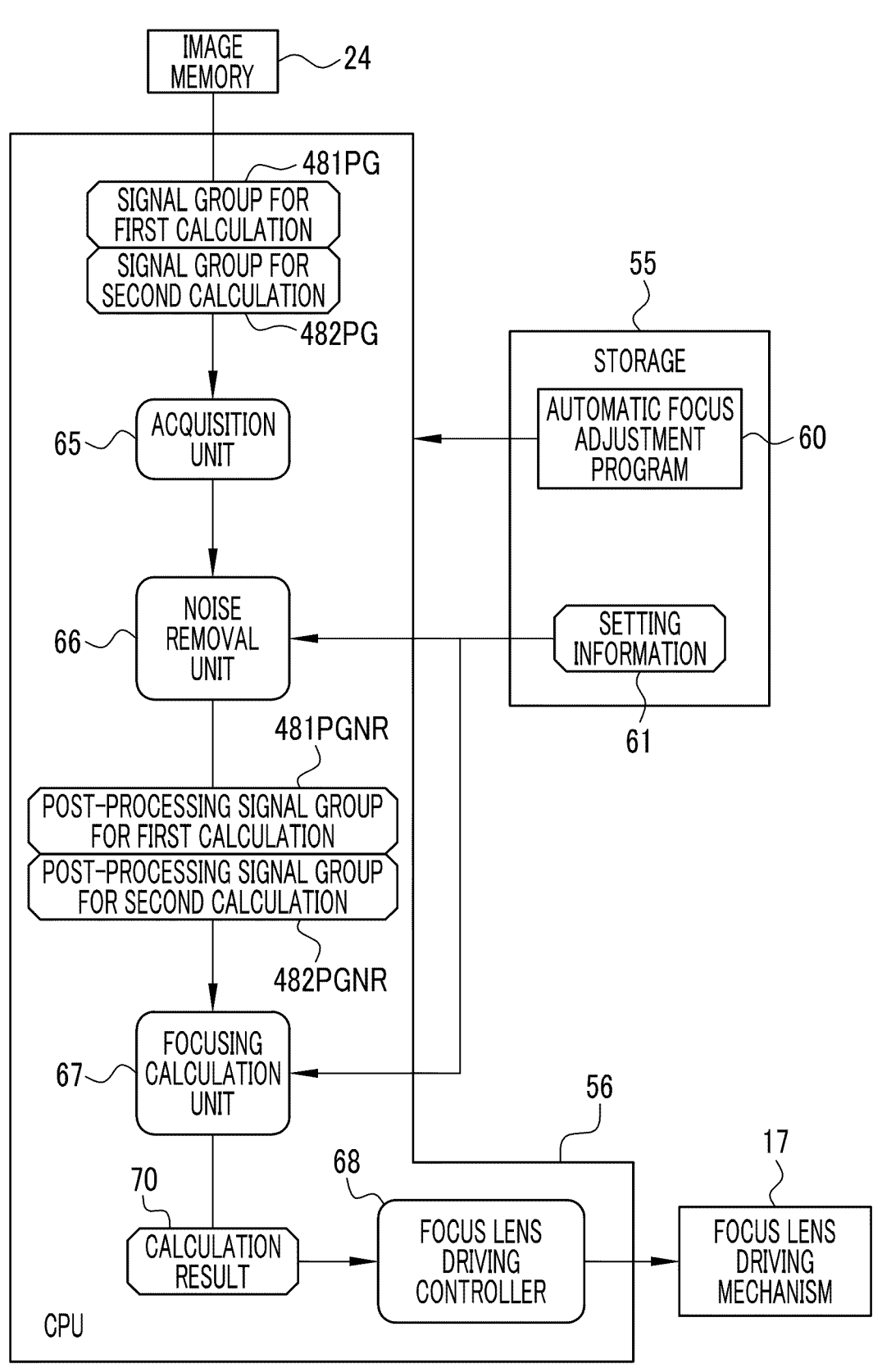
FIG. 8 is a block diagram showing a processing unit of a CPU.

As shown in FIG. 8 as an example, an automatic focus adjustment program 60 is stored in the storage 55. The automatic focus adjustment program 60 is a program for causing the CPU 56 to perform an automatic focus adjustment function. That is, the automatic focus adjustment program 60 is an example of "operation program" according to the technique of the present disclosure. The storage 55 stores setting information 61 in addition to the automatic focus adjustment program 60.

In a case where the automatic focus adjustment program 60 is started, the CPU 56 cooperates with the memory 57 and the like to function as an acquisition unit 65, a noise removal unit 66, a focusing calculation unit 67, and a focus lens driving controller 68.

The acquisition unit 65 acquires, from the image memory 24, a signal group for first calculation 481PG and a signal group for second calculation 482PG. The acquisition unit 65 outputs, to the noise removal unit 66, the signal group for first calculation 481PG and the signal group for second calculation 482PG.

The signal group for first calculation 481PG is data in which a plurality of signals for first calculation 481P, which are output from the plurality of first phase difference detection pixels 411P, are two-dimensionally arranged in the X direction and the Y direction following the arrangement of the first phase difference detection pixels 411P. Similarly, the signal group for second calculation 482PG is data in which a plurality of signals for second calculation 482P, which are output from the plurality of second phase difference detection pixels 412P, are two-dimensionally arranged in the X direction and the Y direction following the arrangement of the second phase difference detection pixels 412P. Therefore, the signal group for first calculation 481PG and the signal group for second calculation 482PG can be handled as two-dimensional image data.

The noise removal unit 66 performs noise removal processing in accordance with the setting information 61 on the signal group for first calculation 481PG and the signal group for second calculation 482PG. The noise removal unit 66 outputs, to the focusing calculation unit 67, the signal group for first calculation 481PG and the signal group for second calculation 482PG subjected to the noise removal processing (hereinafter denoted as post-processing signal group for first calculation 481PGNR and post-processing signal group for second calculation 482PGNR). The noise mainly refers to noise caused by a subject with low contrast and/or low brightness, for example, granular noise caused by setting of high international organization for standardization (ISO) sensitivity.

The focusing calculation unit 67 calculates the phase difference α shown in FIG. 6 from the post-processing signal group for first calculation 481PGNR and the post-processing signal group for second calculation 482PGNR. The focusing calculation unit 67 calculates the focusing position of the focus lens 14 based on the phase difference α, according to the setting information 61. The focusing calculation unit 67 outputs a calculation result 70 of the focusing position of the focus lens 14 to the focus lens driving controller 68. Since a method of calculating the focusing position of the focus lens 14 based on the phase difference α is known, the detailed description thereof will be omitted here.

The focus lens driving controller 68 controls the drive of the focus lens driving mechanism 17 and thus the focus lens 14. Specifically, the focus lens driving controller 68 moves the focus lens 14 to the focusing position of the calculation result 70 via the focus lens driving mechanism 17. In a case where a current position of the focus lens 14 is the same as the focusing position of the calculation result 70, the focus lens 14 is not moved as a matter of course.

Figure 9:
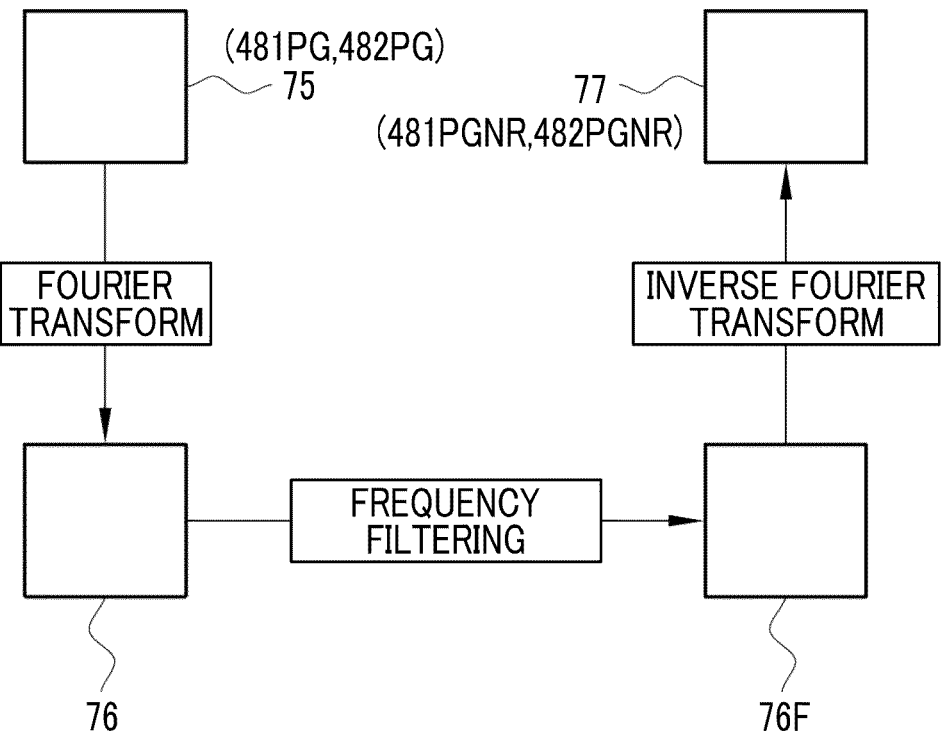
FIG. 9 is a diagram showing noise removal processing.

As shown in FIG. 9 as an example, the noise removal processing by the noise removal unit 66 is performed by the following procedure. First, input image data 75 is subjected to a Fourier transform to obtain spectral image data 76 from the input image data 75. Next, the spectral image data 76 is subjected to frequency filtering using a low-pass filter in which a predetermined frequency parameter is set to obtain post-filtering spectral image data 76F from the spectral image data 76. Finally, post-filtering spectral image data 76F is subjected to an inverse Fourier transform to obtain output image data 77 from the post-filtering spectral image data 76F. In the present example, the input image data 75 is the signal group for first calculation 481PG or the signal group for second calculation 482PG, and the output image data 77 is the post-processing signal group for first calculation 481PGNR or the post-processing signal group for second calculation 482PGNR.

Figure 10:
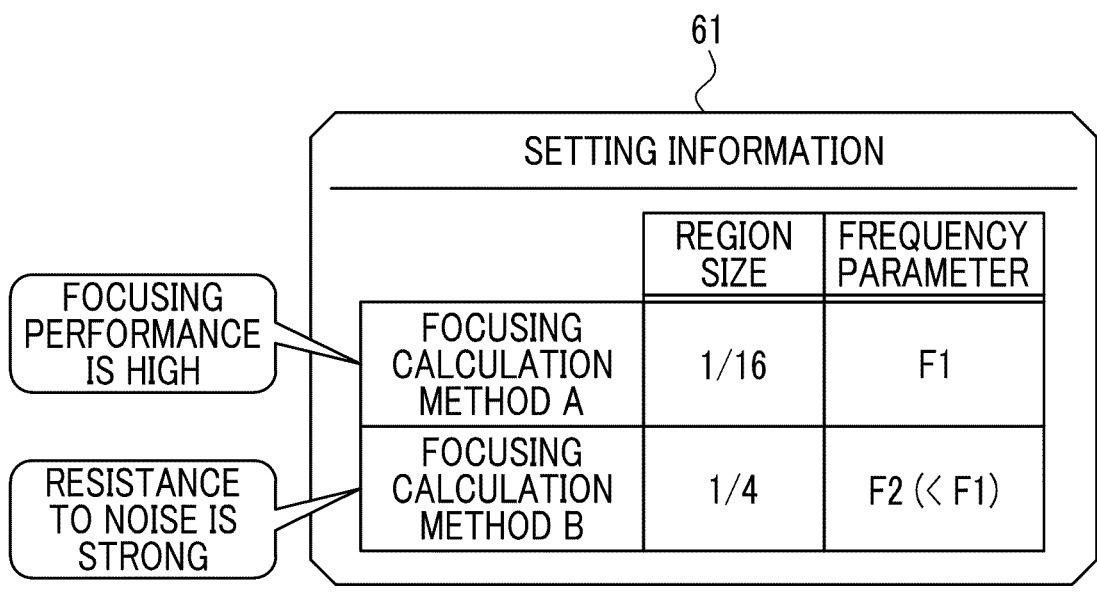
FIG. 10 is a diagram showing setting information.

As shown in FIG. 10 as an example, a size of a region 80 (refer to FIGS. 11 and 12) where the signal for calculation 48P is acquired, for each of two focusing calculation methods of a focusing calculation method A and a focusing calculation method B, and the frequency parameter of the low-pass filter in the frequency filtering of the noise removal processing are registered in the setting information 61. In the focusing calculation method A, 1/16 and F1 are respectively registered as the size of the region 80 and the frequency parameter. In the focusing calculation method B, ¼ and F2 are respectively registered as the size of the region 80 and the frequency parameter.

Figure 11:
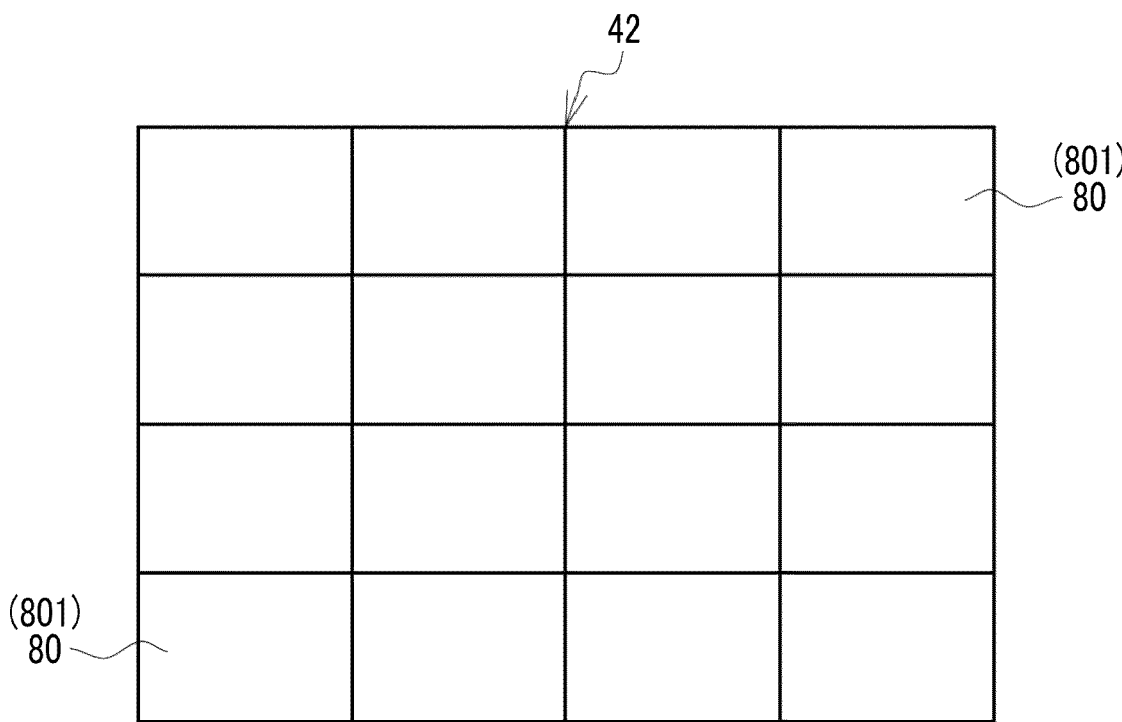
FIG. 11 is a diagram showing a region where a signal for calculation is acquired in a focusing calculation method A.

As shown in FIG. 11 as an example, specifically, the region 80 in the focusing calculation method A is one region in a case where the imaging surface 42 of the imaging element 12 is vertically and horizontally divided into four equal parts (16 equal parts as the entire imaging surface 42). Hereinafter, this region 80 is denoted as a first region 801.

Figure 12:
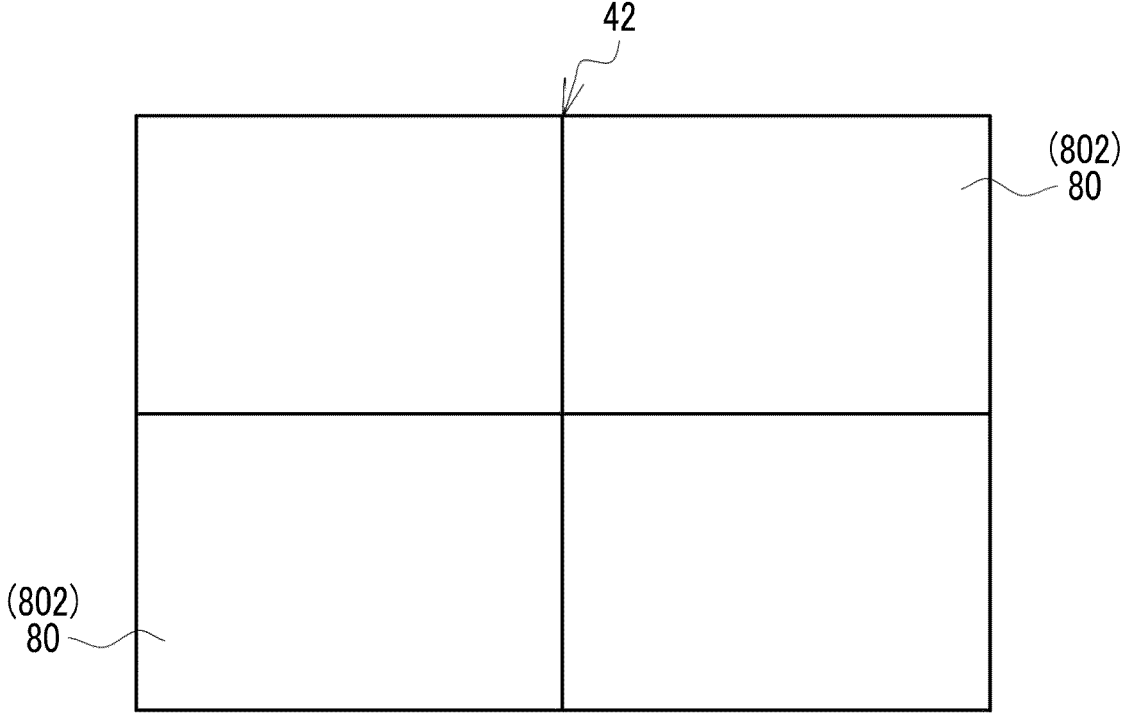
FIG. 12 is a diagram showing a region where the signal for calculation is acquired in a focusing calculation method B.

Further, as shown in FIG. 12 as an example, specifically, the region 80 in the focusing calculation method B is one region in a case where the imaging surface 42 of the imaging element 12 is vertically and horizontally divided into two equal parts (four equal parts as the entire imaging surface 42). Hereinafter, the region 80 is denoted as a second region 802.

The second region 802 is larger than the first region 801. Further, the frequency parameter F2 is smaller than the frequency parameter F1 (F2<F1). Here, as the region 80 is larger, focusing performance is lower, but resistance to noise is higher. Further, as the frequency parameter is lower, a high-frequency component that includes a large amount of noise such as the granular noise is more removed. Thus, the focusing performance is lower but the resistance to noise is higher. Therefore, as shown in balloons of FIG. 10, the focusing calculation method A has weaker resistance to noise than the focusing calculation method B, but has higher focusing performance than the focusing calculation method B. Conversely, the focusing calculation method B has lower focusing performance than the focusing calculation method A, but the focusing calculation method B has stronger resistance to noise than the focusing calculation method A. Since the focusing calculation method A has higher focusing performance than the focusing calculation method B, the focusing calculation method A is the method with the highest focusing performance in the present example. The focusing performance can be rephrased as focusing accuracy. The focusing calculation method A is an example of "first focusing calculation method" according to the technique of the present disclosure. Further, the focusing calculation method B is an example of "second focusing calculation method" according to the technique of the present disclosure. Furthermore, the focusing performance of the focusing calculation method B is an example of "first threshold value" according to the technique of the present disclosure.

As shown in FIG. 13 as an example, in a case where the full push state of the release button is continued for the predetermined time or longer and the instruction receiving unit 30 receives a continuous capturing start instruction (in a case where the continuous capturing mode is activated), the CPU 56 drives the imaging element 12 via the imaging element driver 22. The imaging element 12 is caused to repeat, at the predetermined capturing interval, the accumulation (hereinafter denoted as exposure) of the signal charge corresponding to the subject light and the reading out (hereinafter denoted as readout) of the voltage signal corresponding to the signal charge.

The noise removal unit 66 and the focusing calculation unit 67 of the CPU 56 always perform a focusing calculation AC using the focusing calculation method A first. In a case where a reliability degree of the focusing calculation AC is high, the noise removal unit 66 and the focusing calculation unit 67 do not perform a focusing calculation BC by the focusing calculation method B. The focus lens driving controller 68 moves, until a start of the exposure of the next frame, the focus lens 14 to the focusing position of the calculation result 70 of the focusing calculation AC via the focus lens driving mechanism 17.

On the contrary, in a case where the reliability degree of the focusing calculation AC is low, the noise removal unit 66 and the focusing calculation unit 67 perform the focusing calculation BC following the focusing calculation AC. In a case where the reliability degree of the focusing calculation BC is high, the focus lens driving controller 68 moves, until a start of the exposure of the next frame, the focus lens 14 to the focusing position of the calculation result 70 of the focusing calculation BC via the focus lens driving mechanism 17. The reliability degree of the focusing calculation BC becomes low very rarely. However, in a case where the reliability degree becomes low, the state is maintained until the reliability degree of any one of the focusing calculations becomes high.

Figure 14:
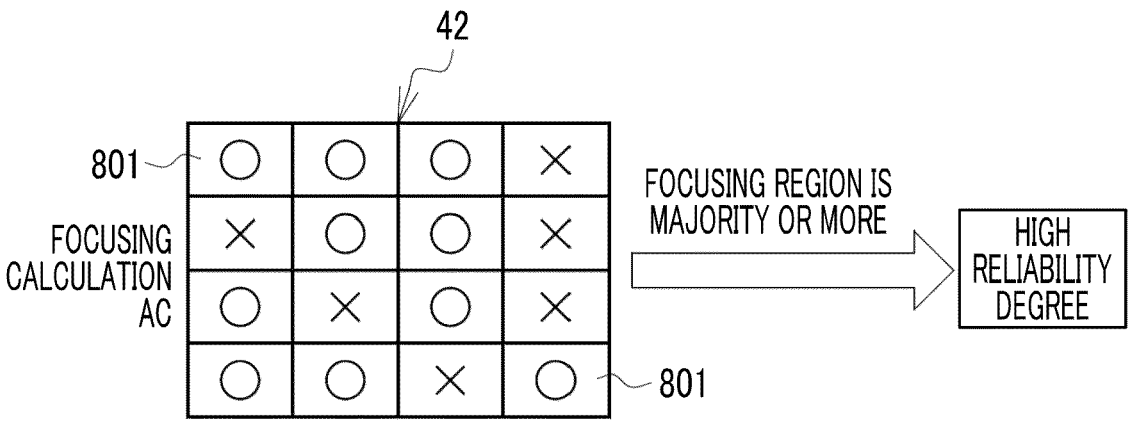
FIG. 14 is a diagram showing a case where a reliability degree of the focusing calculation AC is determined to be high.
Figure 15:
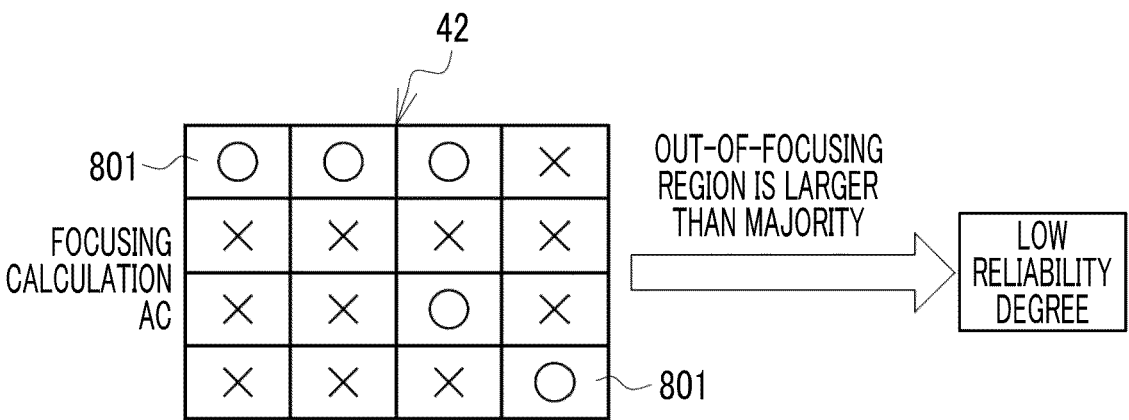
FIG. 15 is a diagram showing a case where the reliability degree of the focusing calculation AC is determined to be low.

As shown in FIGS. 14 and 15 as an example, the high or low determination for the reliability degree of the focusing calculation AC is performed based on determination of focusing or out-of-focusing of each first region 801. Specifically, as shown in FIG. 14, in a case where the number of the first regions 801 (indicated by ○) determined to be focusing is the majority (eight in the present example) or more, the CPU 56 determines that the reliability degree of the focusing calculation AC is high. In this case, the focusing calculation unit 67 outputs, as the calculation result 70, a calculation result for one of a plurality of first regions 801 determined to be focusing, for example, one first region 801 close to the center of the imaging surface 42. On the contrary, as shown in FIG. 15, in a case where the number of the first regions 801 (indicated by x) determined to be out-of-focusing is larger than the majority, the CPU 56 determines that the reliability degree of the focusing calculation AC is low. The majority of first region 801 is an example of "second threshold value" according to the technique of the present disclosure. The case where the number of the first regions 801 determined to be out-of-focusing is larger than the majority is an example of "case where the reliability degree of the focusing calculation by the first focusing calculation method is lower than the second threshold value" according to the technique of the present disclosure.

Figure 16:
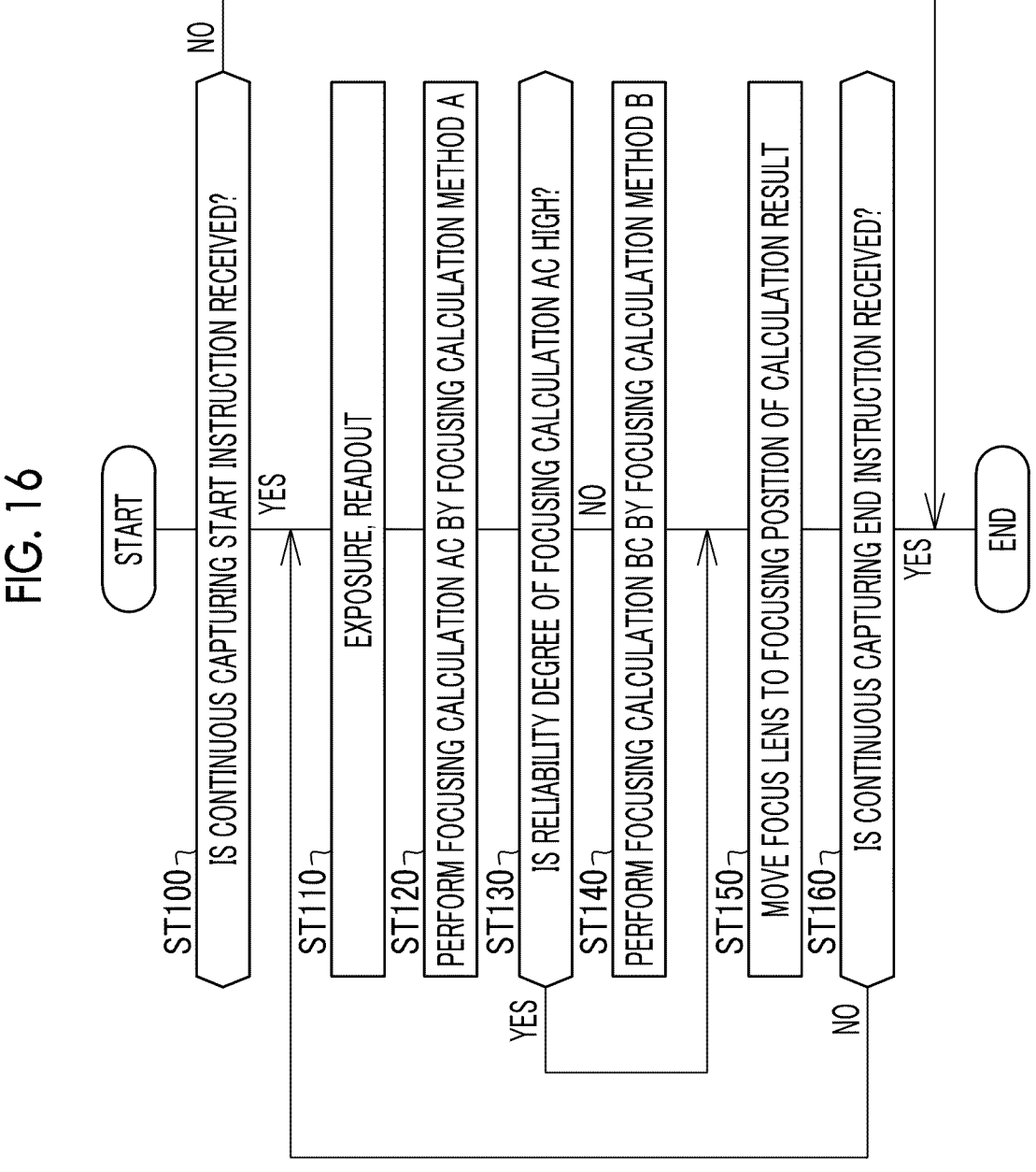
FIG. 16 is a flowchart showing a processing procedure of the CPU during the continuous capturing.

Next, an action of the above configuration will be described with reference to a flowchart shown in FIG. 16 as an example. As shown in FIG. 8, the CPU 56 functions, with the start of the automatic focus adjustment program 60, as the acquisition unit 65, the noise removal unit 66, the focusing calculation unit 67, and the focus lens driving controller 68.

In a case where the full push state of the release button is continued for the predetermined time or longer and the instruction receiving unit 30 receives the continuous capturing start instruction (YES in step ST100), as shown in FIG. 13, the imaging element 12 is driven, under the control of the CPU 56, via the imaging element driver 22 to perform the accumulation (exposure) of the signal charge corresponding to the subject light and the reading out (readout) of the voltage signal corresponding to the signal charge (step ST110). Accordingly, the image data including the signal for image generation 48N and the signal for calculation 48P is stored in the image memory 24. The image data is read out from the image memory 24 to the image processing unit 25, subjected to the various types of image processing by the image processing unit 25, and then written back to the image memory 24.

In the CPU 56, the acquisition unit 65 acquires the signal group for first calculation 481PG and the signal group for second calculation 482PG from the image memory 24. The signal group for first calculation 481PG and the signal group for second calculation 482PG are output from the acquisition unit 65 to the noise removal unit 66.

In the noise removal unit 66, the frequency parameter of the low-pass filter used for the frequency filtering is set to F1 of the focusing calculation method A according to the setting information 61. Then, the noise removal processing shown in FIG. 9 is performed on the signal group for first calculation 481PG and the signal group for second calculation 482PG. The signal group for first calculation 481PG and the signal group for second calculation 482PG subjected to the noise removal processing, that is, the post-processing signal group for first calculation 481PGNR and the post-processing signal group for second calculation 482PGNR are output from the noise removal unit 66 to the focusing calculation unit 67.

In the focusing calculation unit 67, the focusing calculation is performed for each first region 801, according to the setting information 61, based on the signal for calculation 48P acquired from each first region 801. That is, the focusing calculation AC by the focusing calculation method A is performed (step ST120).

As shown in FIG. 14, in a case where the reliability degree of the focusing calculation AC is determined to be high (YES in step ST130), the focus lens 14 is moved, under the control of the focus lens driving controller 68, to the focusing position of the calculation result 70 of the focusing calculation AC via the focus lens driving mechanism 17 (step ST150).

On the contrary, as shown in FIG. 15, in a case where the reliability degree of the focusing calculation AC is determined to be low (NO in step ST130), in the noise removal unit 66, the frequency parameter of the low-pass filter used for the frequency filtering is set to F2 of the focusing calculation method B according to the setting information 61. Then, the noise removal processing is performed on the signal group for first calculation 481PG and the signal group for second calculation 482PG. Further, in the focusing calculation unit 67, the focusing calculation is performed for each second region 802, according to the setting information 61, based on the signal for calculation 48P acquired from each second region 802. That is, the focusing calculation BC by the focusing calculation method B is performed (step ST140).

In a case where the reliability degree of the focusing calculation BC is determined to be high, the focus lens 14 is moved, under the control of the focus lens driving controller 68, to the focusing position of the calculation result 70 of the focusing calculation BC via the focus lens driving mechanism 17 (step ST150). The series of pieces of processing of step ST110 to step ST150 described above is repeatedly performed until the release button is released from the full push state and the instruction receiving unit 30 receives a continuous capturing end instruction (NO in step ST160).

As described above, the imaging apparatus 10 has the automatic focus adjustment function that performs the focusing calculation for calculating the focusing position of the focus lens 14 based on the signal for calculation 48P read out from the imaging element 12. The focusing calculation includes the focusing calculation method A and the focusing calculation method B with different focusing performance and resistance to noise on the signal for calculation 48P. The noise removal unit 66 and the focusing calculation unit 67 of the CPU 56 select, based on the result of performing the focusing calculation at least once by the focusing calculation method A, the focusing calculation method from the focusing calculation method A and the focusing calculation method B and perform the focusing calculation using the selected focusing calculation method. More specifically, in a case where the reliability degree of the focusing calculation AC by the focusing calculation method A is high, the focusing calculation method A is selected. On the contrary, in a case where the reliability degree of the focusing calculation AC by the focusing calculation method A is low, the focusing calculation method B is selected.

For example, in a case where the focusing calculation method is alternatively selected in accordance with a certain condition, such as selecting the focusing calculation method A in a case where the ISO sensitivity is less than a threshold value and selecting the focusing calculation method B in a case where the ISO sensitivity is equal to or larger than the threshold value, there is a risk that the focusing calculation BC, which has relatively low focusing performance, is performed even though the focusing is actually achieved by the focusing calculation AC. However, in the technique of the present disclosure, the focusing calculation AC is always performed and then the focusing calculation method is selected based on the result. Thus, there is no risk that the situation as described above occurs. Therefore, it is possible to select a more practical focusing calculation method.

As shown in FIG. 10, the focusing calculation method A is a method in which the focusing performance is higher than the first threshold value among the plurality of focusing calculation methods. Further, the focusing calculation method A is a method with the highest focusing performance among the plurality of focusing calculation methods. Therefore, in a case where the focusing calculation method A is selected, it is possible to calculate a more accurate focusing position of the focus lens 14.

As shown in FIG. 13, in a case where the reliability degree of the focusing calculation AC by the focusing calculation method A is lower than the second threshold value, the noise removal unit 66 and the focusing calculation unit 67 perform at least once the processing of performing the focusing calculation BC using the focusing calculation method B, which has lower focusing performance but stronger resistance to noise than the focusing calculation method A. Therefore, as compared with a case where the focusing calculation is performed by only one type of focusing calculation method, it is possible to increase a probability that the focusing calculation converges to achieve the focusing. In particular, in a case where the out-of-focusing occurs in the middle of the continuous capturing mode, the followability of the automatic focus adjustment is lost. Thus, it is important to increase the probability that the focusing calculation converges to achieve the focusing.

As shown in FIGS. 10 to 12, the size of the region 80 of the imaging element 12, which is the region 80 where the signal for calculation 48P used for the focusing calculation is acquired, differs between the focusing calculation method A and the focusing calculation method B. The focusing calculation method with a larger size of the region 80, in this case, the focusing calculation method B has stronger resistance to noise. Further, as shown in FIG. 10, the frequency parameter in the noise removal processing performed on the signal for calculation 48P differs between the focusing calculation method A and the focusing calculation method B. The focusing calculation method with a lower frequency parameter, in this case, the focusing calculation method B has stronger resistance to noise. Therefore, the focusing performance and the resistance to noise can be easily made different between the focusing calculation method A and the focusing calculation method B.

In a case where the reliability degree of the focusing calculation BC by the focusing calculation method B, which is performed in a case where the reliability degree of the focusing calculation AC by the focusing calculation method A is lower than the second threshold value, is also low, the focusing calculation BC by the focusing calculation method B may be repeated several times with resetting of the frequency parameter F2 to be slightly lower, or the like. As described above, in a case where the reliability degree of the focusing calculation AC by the focusing calculation method A is lower than the second threshold value, there may be various aspects of the processing of performing the focusing calculation BC using the focusing calculation method B.

Second Embodiment

Figure 17:
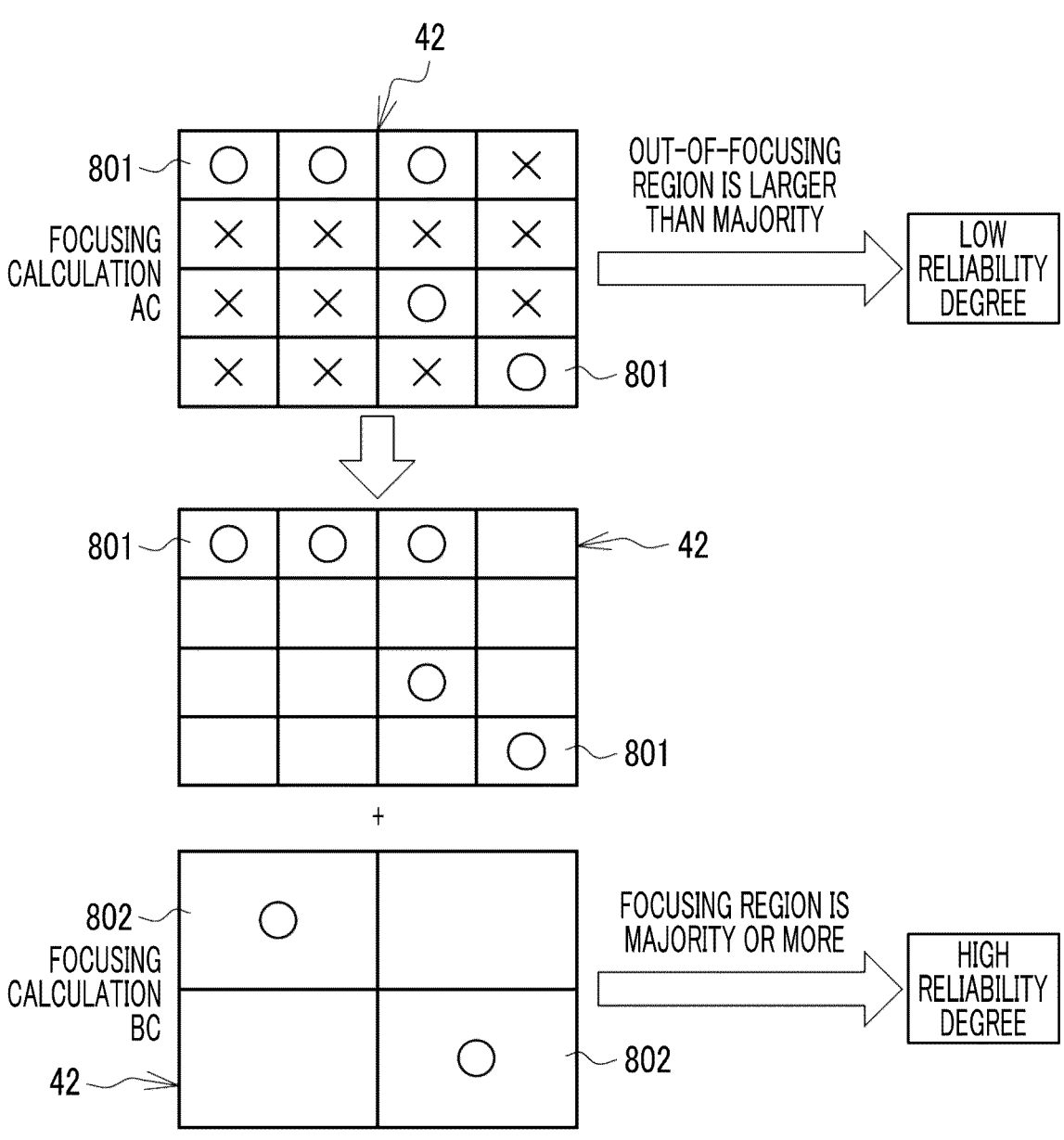
FIG. 17 is a diagram showing a second embodiment in which a result of the focusing calculation AC by the focusing calculation method A is used for the focusing calculation BC by the focusing calculation method B.

As shown in FIG. 17 as an example, in a second embodiment, the focusing calculation unit 67 performs the focusing calculation BC on only the second region 802 in which the number of the first regions 801 determined to be focusing occupies the majority or more in the focusing calculation AC. FIG. 17 illustrates a case where the second region 802, in which the number of the first regions 801 determined to be focusing occupies the majority or more in the focusing calculation AC, is upper left and lower right regions. With the above, a probability that the reliability degree of the focusing calculation BC becomes high is increased, and at the same time, a calculation time required for the focusing calculation BC can be shortened.

The phase difference α calculated for the first region 801 determined to be focusing in the focusing calculation AC may be incorporated into the focusing calculation BC. For example, the focusing position of the focus lens 14 is calculated based on an average value of the phase difference α calculated in the focusing calculation AC and the phase difference α calculated in the focusing calculation BC. Alternatively, as another method, the following method can also be employed. That is, in the focusing calculation AC, the noise removal processing is performed by changing the frequency parameter in various ways in each first region 801. The focusing calculation BC selectively uses the phase difference α and the like of the first region 801, among the first regions 801 determined to be focusing, subjected to the noise removal processing by using the frequency parameter close to the frequency parameter F2 of the focusing calculation BC.

As described above, in the second embodiment, the focusing calculation unit 67 uses the result of the focusing calculation AC by the focusing calculation method A for the focusing calculation BC by the focusing calculation method B. Therefore, the focusing calculation AC can be effectively used without being wasted. Further, it is possible to compensate for a demerit of the focusing calculation method B that the focusing performance is low.

Third Embodiment

Figure 18:
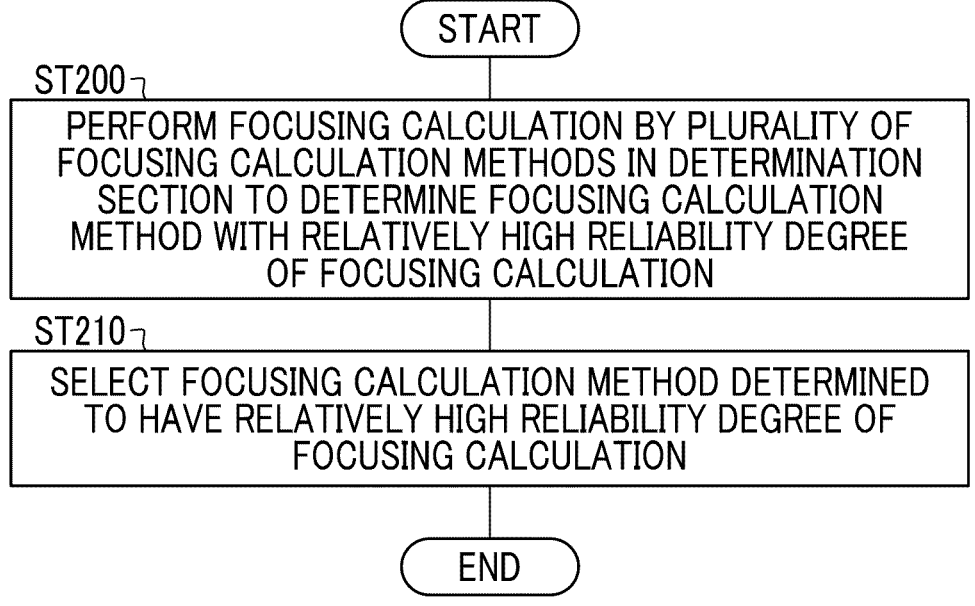
FIG. 18 is a flowchart showing a processing procedure of the CPU in a third embodiment.

As shown in a flowchart of FIG. 18 as an example, in a third embodiment, the CPU 56 performs the focusing calculation by the plurality of the focusing calculation methods in a determination section to determine the focusing calculation method with a relatively high reliability degree of the focusing calculation (step ST200). The focusing calculation method determined to have the relatively high reliability degree of the focusing calculation is selected (step ST210).

Figure 19:
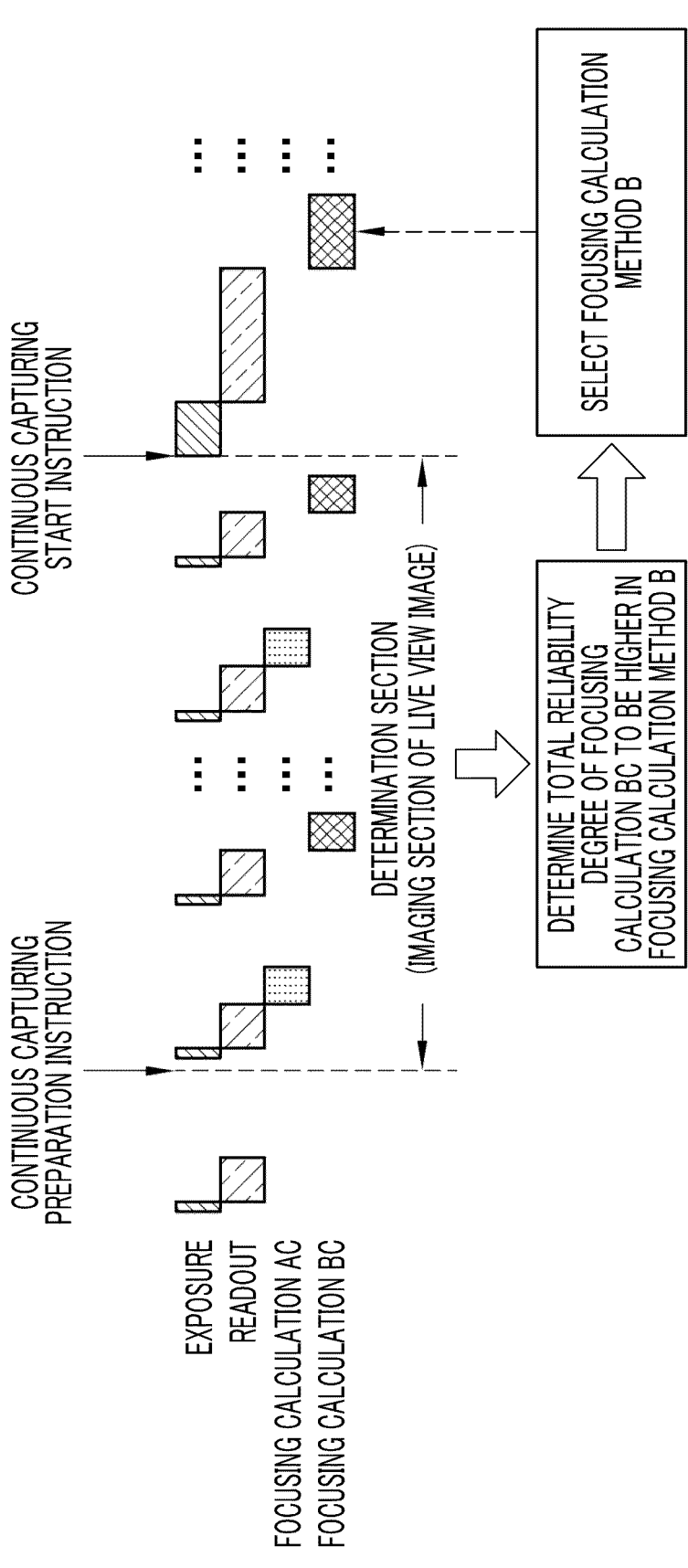
FIG. 19 is a diagram showing a case where a determination section is an imaging section of a live view image.

FIG. 19 shows an example in which the determination section is an imaging section of the live view image. For example, in a case where the release button is half-pushed and the instruction receiving unit 30 receives a continuous capturing preparation instruction, the noise removal unit 66 and the focusing calculation unit 67 alternately perform the focusing calculation AC and the focusing calculation BC in the imaging section of the live view image after continuous capturing preparation instruction. The CPU 56 obtains a total reliability degree of the focusing calculation AC and the focusing calculation BC in this case. The total reliability degree is obtained by dividing the number of times the reliability degree of the focusing calculation is determined to be high in the imaging section of the live view image after continuous capturing preparation instruction by the total number of times the focusing calculation is performed in the imaging section of the live view image after continuous capturing preparation instruction. For example, in a case where the total number of times the focusing calculation BC is performed is 10 times and the number of times the reliability degree of the focusing calculation BC is determined to be high is 8 times, the total reliability degree of the focusing calculation BC is 8/10=0.8. The total reliability degree is an example of "reliability degree" in "the determination section in which the focusing calculation by the plurality of the focusing calculation methods is performed to determine the focusing calculation method with the relatively high reliability degree of the focusing calculation" according to the technique of the present disclosure.

The CPU 56 selects the focusing calculation method with high total reliability degree as the focusing calculation method performed after the continuous capturing start instruction. FIG. 19 illustrates a case where the total reliability degree of the focusing calculation BC is determined to be higher in the focusing calculation method B, and the focusing calculation method B is selected.

Figure 20:
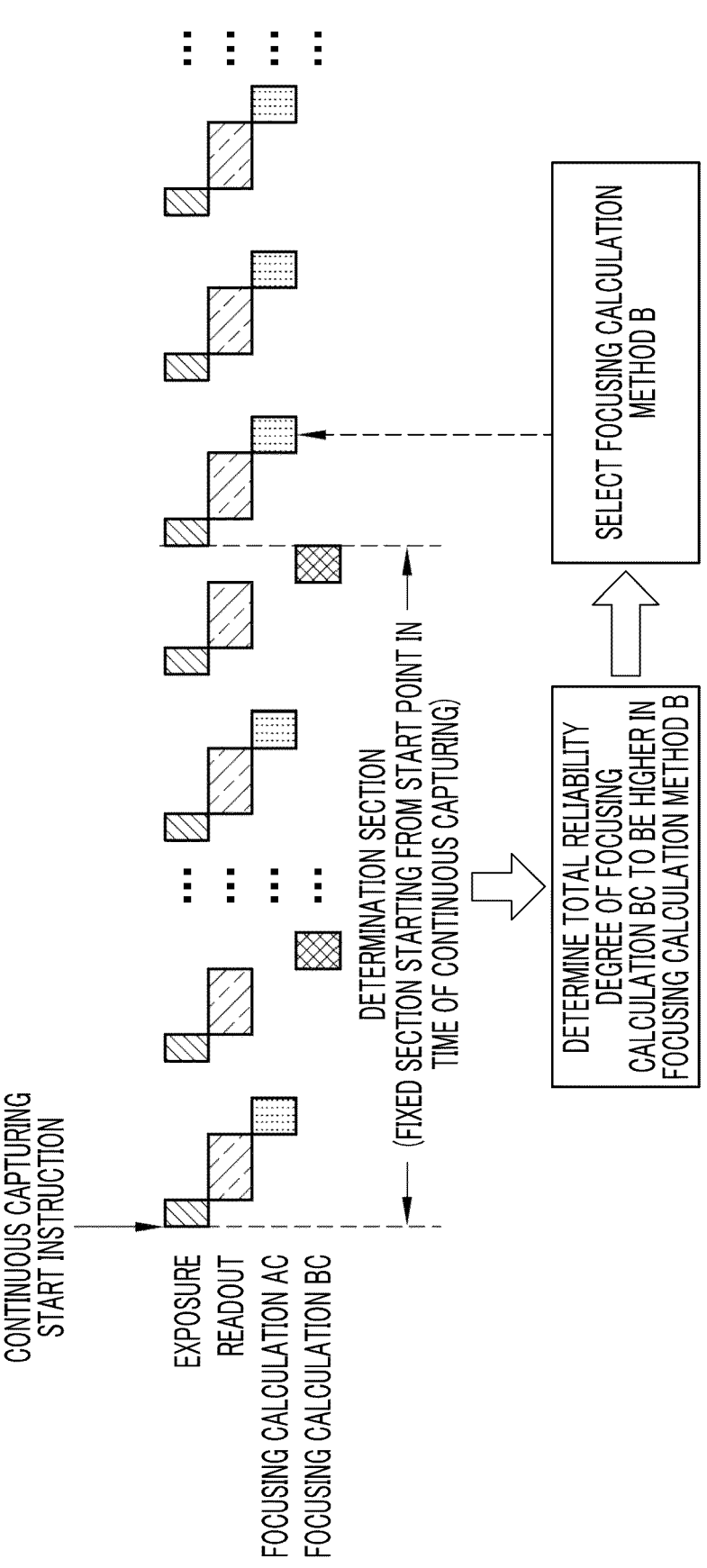
FIG. 20 is a diagram showing a case where the determination section is a fixed section starting from a point in time at which the continuous capturing is started.

FIG. 20 shows an example in which the determination section is a fixed section starting from a start point in time of the continuous capturing. The fixed section starting from the start point in time of the continuous capturing is an example of "fixed section starting from the start point in time of main imaging" according to the technique of the present disclosure. In a case where the full push state of the release button is continued for the predetermined time or longer and the instruction receiving unit 30 receives the continuous capturing start instruction, the noise removal unit 66 and the focusing calculation unit 67 alternately perform the focusing calculation AC and the focusing calculation BC in the fixed section (for example, section for 10 frames) of the continuous capturing after the continuous capturing start instruction. As in the case of FIG. 19, the CPU 56 obtains the total reliability degree of the focusing calculation AC and the focusing calculation BC in this case. The CPU 56 selects the focusing calculation method with high total reliability degree as the focusing calculation method performed after an end of the fixed section. As in the case of FIG. 19, FIG. 20 illustrates the case where the total reliability degree of the focusing calculation BC is determined to be higher in the focusing calculation method B, and the focusing calculation method B is selected.

In the case of FIG. 20, in the determination section, the focusing calculation unit 67 calculates the focusing position of the focus lens 14 based on the calculation result 70 of the focusing calculation, among the focusing calculation AC and the focusing calculation BC, in which the focusing is achieved. Further, in both cases of FIGS. 19 and 20, in a case where the total reliability degree of the focusing calculation AC is the same as the total reliability degree of the focusing calculation BC, the CPU 56 selects the focusing calculation method A with high focusing performance.

As described above, in the third embodiment, there is the determination section in which the focusing calculation is performed by the plurality of focusing calculation methods to determine the focusing calculation method with the relatively high reliability degree of the focusing calculation. The determination section may be the imaging section of the live view image as shown in FIG. 19, or may be the fixed section starting from the start point in time of the continuous capturing as shown in FIG. 20. The CPU 56 selects the focusing calculation method determined to have the relatively high reliability degree in the determination section. Therefore, as in the first embodiment, it is possible to select a more practical focusing calculation method. Further, since the focusing calculation is performed only by the selected focusing calculation method after the determination section, the processing load can be reduced. Furthermore, it is also possible to cope with a case where the capturing interval of the continuous capturing is short to such an extent that a sufficient time for which the focusing calculation BC is performed after the focusing calculation AC is performed cannot be ensured.

In both cases of FIGS. 19 and 20, the focusing calculation AC and the focusing calculation BC are alternately performed, but the present disclosure is not limited thereto. Each time exposure or readout is performed, both the focusing calculation AC and the focusing calculation BC may be performed.

The determination section is not limited to the fixed section starting from the start point in time of the continuous capturing. Any fixed section in the middle of the continuous capturing may be used as the determination section. With the above, it is possible to cope with a case where the focusing calculation method with high total reliability degree of the focusing calculation is changed in the middle of the continuous capturing.

A configuration may be employed in which the user can select whether to perform the first embodiment or the third embodiment. Further, a configuration may be employed in which the user can select whether the determination section is the imaging section of the live view image or the fixed section starting from the start point in time of the continuous capturing.

Fourth Embodiment

As shown in FIG. 21 as an example, in a fourth embodiment, the imaging element 12 separately reads out the signal for image generation 48N and the signal for calculation 48P under the control of the controller 20. The signal for calculation 48P is read out prior to the signal for Image generation 48N. The noise removal unit 66 and the focusing calculation unit 67 read out the signal for calculation 48P and then immediately perform the focusing calculation AC and, in some cases, the focusing calculation BC. With the above, it is possible to perform the focusing calculation without waiting for the readout of the signal for image generation 48N, and it is possible to calculate the focusing position of the focus lens 14 at an earlier timing. It is possible to ensure the sufficient time for which the focusing calculation BC is performed after the focusing calculation AC is performed. Therefore, in the case of the first embodiment, it is not possible to set the capturing interval of the continuous capturing to be short so much in order to ensure the time for performing the focusing calculation BC after the focusing calculation AC is performed. However, in the present embodiment, it is possible to set the capturing interval of the continuous capturing to be shorter than that in the first embodiment.

In each of the embodiments described above, two of the focusing calculation method A and the focusing calculation method B are exemplified as the plurality of focusing calculation methods, but the present invention is not limited thereto. As in setting information 85 shown in FIG. 22 as an example, there may be three focusing calculation methods of a focusing calculation method D, a focusing calculation method E, and a focusing calculation method F. The focusing calculation method D is the same as the focusing calculation method A of each of the embodiments described above. In the focusing calculation method E, ⅕ is registered as the size of the region 80 and F3 is registered as the frequency parameter, respectively. In the focusing calculation method F, ¼ is registered as the size of the region 80, and F4 is registered as the frequency parameter, respectively. Although not shown, the region 80 in the focusing calculation method E is one region in a case where the imaging surface 42 of the imaging element 12 is vertically and horizontally divided into three equal parts (nine equal parts as the entire imaging surface 42). Further, the frequency parameter F3 is smaller than the frequency parameter F1 (F3<F1), and the frequency parameter F4 is smaller than the frequency parameter F3 (F4<F3). Therefore, the focusing calculation method D is a method with the highest focusing performance, and the focusing calculation method F is a method with the strongest resistance to noise. The focusing calculation method E is a method with both moderate focusing performance and resistance to noise.

In the case of FIG. 22, the noise removal unit 66 and the focusing calculation unit 67 first perform a focusing calculation DC by the focusing calculation method D. In a case where the reliability degree of the focusing calculation DC is low, a focusing calculation EC by the focusing calculation method E is performed this time. Further, in a case where the reliability degree of the focusing calculation EC is also low, a focusing calculation FC by the focusing calculation method F is performed. In this case, the focusing calculation method D is an example of "first focusing calculation method" according to the technique of the present disclosure. Further, the focusing calculation method E and the focusing calculation method F are examples of "second focusing calculation method" according to the technique of the present disclosure.

In a case where the reliability degree of the focusing calculation DC by the focusing calculation method D is predictable in advance to be lowered by the brightness of the subject, the setting of the ISO sensitivity, or the like, the focusing calculation EC by the focusing calculation method E may be first performed. In this case, the focusing calculation method E is an example of "first focusing calculation method" according to the technique of the present disclosure. That is, the first focusing calculation method is not limited to the method with the highest focusing performance among the plurality of focusing calculation methods.

In each of the embodiments described above, the so-called automatic focus adjustment function of phase difference detection type has been described as an example, but the present invention is not limited thereto. Instead of or in addition to the automatic focus adjustment function of phase difference detection type, an automatic focus adjustment function of contrast detection type may be employed.

In a case of the automatic focus adjustment function of contrast detection type, as in the setting information 87 shown in FIG. 23 as an example, a method of pixel mixing at the time of reading out the voltage signal may be changed for each of three focusing calculation methods of a focusing calculation method G, a focusing calculation method H, and a focusing calculation method I. The size and frequency parameter of each of the regions 80 of the focusing calcu-lation method G, the focusing calculation method H, and the focusing calculation method I are the same as those of the focusing calculation method D, the focusing calculation method E, and the focusing calculation method F shown in FIG. 22. However, the focusing calculation method G is a setting of no pixel mixing, the focusing calculation method H is a setting of performing 2×2 pixel mixing, and the focusing calculation method I is a setting of performing 3×3 pixel mixing. The focusing calculation method with a larger number of pieces of pixel mixing has stronger resistance to noise. Even in a case where the method of pixel mixing is made different in this manner, the focusing performance and resistance to noise of the plurality of focusing calculation methods can be made different.

An imaging element may be used in which one pixel 41 is configured of two photoelectric conversion elements 47 and the one pixel 41 serves as the normal pixel 41N and the phase difference detection pixel 41P. In this case, the aspect may be implemented in which the method of pixel mixing at the time of reading out the voltage signal is made different, which is shown in FIG. 23.

The focusing calculation AC by the focusing calculation method A may be performed in a case where the capturing interval of the continuous capturing is equal to or larger than a threshold value, and the focusing calculation BC by the focusing calculation method B may be performed in a case where the capturing interval of the continuous capturing is less than the threshold value. The threshold value is set based on a time during which the focusing calculation BC can be performed after the focusing calculation AC is performed. Further, the focusing calculation AC by the focusing calculation method A may be performed in a case of the continuous capturing using a mechanical shutter, and the focusing calculation BC by the focusing calculation method B may be performed in a case of the continuous capturing using an electronic shutter. Furthermore, the focusing calculation AC by the focusing calculation method A may be performed in a case where an exposure time is shorter than a threshold value, and the focusing calculation BC by the focusing calculation method B may be performed in a case where the exposure time is equal to or longer than the threshold value.

Figure 24:
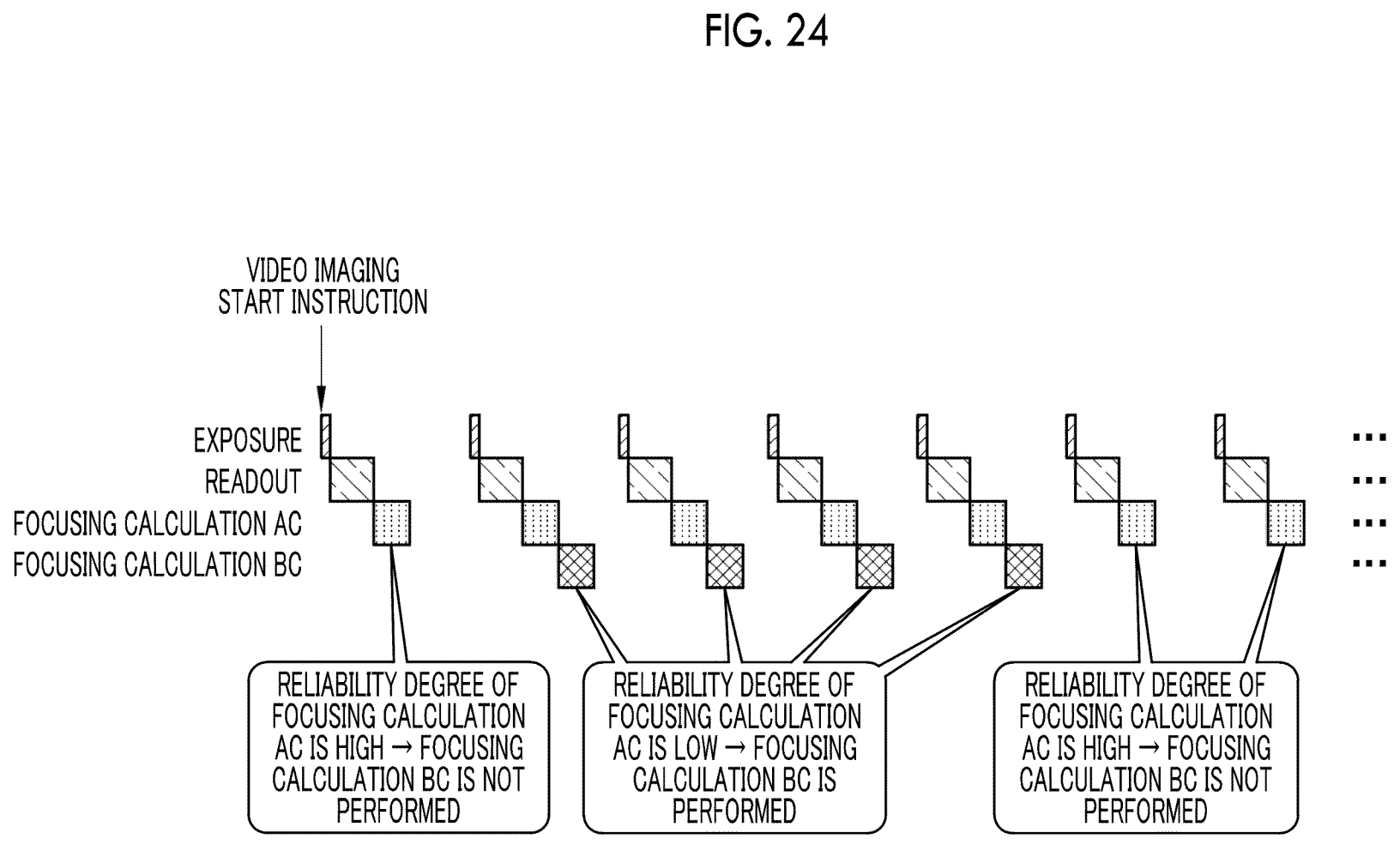

In each of the embodiments described above, the case has been exemplified in which the technique of the present disclosure is applied in a case where the continuous captur-ing mode is activated, but the technique of the present disclosure is not limited thereto. As shown in FIG. 24 as an example, the technique of the present disclosure may be applied to a case where the instruction receiving unit 30 receives a video imaging start instruction and the video imaging mode is activated. FIG. 24 shows an example in which the first embodiment is implemented in a case where the video imaging mode is activated.

The aspect of the third embodiment shown in FIG. 20 may be implemented in a case where the video imaging mode is activated. In this case, any fixed section in the middle of the video imaging may be used as the determination section. With the above, in the video imaging in which a capturing time is long as compared with the continuous capturing, it is possible to always perform the focusing calculation using an optimum focusing calculation method.

The imaging apparatus according to the technique of the present disclosure may be a compact digital camera, a smartphone, or a tablet terminal.

In each of the embodiments described above, for example, as a hardware structure of processing units that execute various types of processing, such as the acquisition unit 65, the noise removal unit 66, the focusing calculation unit 67, and the focus lens driving controller 68, the various proces-sors described below may be used. The various processors include, for example, the CPU 56 which is a general-purpose processor executing software (automatic focus adjustment program 60) to function as various processing units, a programmable logic device (PLD), such as a field program-mable gate array (FPGA), which is a processor whose circuit configuration can be changed after manufacture, and/or a dedicated electric circuit, such as an application specific integrated circuit (ASIC), which is a processor having a dedicated circuit configuration designed to execute specific processing.

One processing unit may be configured by one of the various types of processors or may be configured by a combination of two or more processors of the same type or different types (for example, a combination of a plurality of FPGAs and/or a combination of a CPU and an FPGA). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one inte-grated circuit (IC) chip is used, as represented by a system-on-chip (SoC) or the like. As described above, the various processing units are configured using one or more of the various processors as the hardware structure.

More specifically, a circuitry combining circuit elements such as semiconductor elements may be used as the hard-ware structure of the various processors.

It is possible to understand the techniques described in the following supplementary notes from the above description.

Supplementary Note 1

An imaging apparatus having an automatic focus adjust-ment function of performing a focusing calculation of cal-culating a focusing position of a focus lens based on a signal for calculation read out from an imaging element, in which the focusing calculation includes a plurality of focusing calculation methods with different focusing performance and resistance to noise on the signal for calculation, the imaging apparatus comprising:

a processor, wherein the processor is configured to:

select a focusing calculation method from among the plurality of focusing calculation methods based on a result of performing the focusing calculation at least once using a first focusing calculation method which is one of the plurality of focusing calculation methods; and perform the focusing calculation using the selected focus-ing calculation method.

Supplementary Note 2

The imaging apparatus according to Supplementary Note 1, wherein the first focusing calculation method is a method with the focusing performance higher than a first threshold value among the plurality of focusing calculation methods.

Supplementary Note 3

The imaging apparatus according to Supplementary Note 2, wherein the first focusing calculation method is a method with highest focusing performance among the plurality of focusing calculation methods.

Supplementary Note 4

The imaging apparatus according to any one of Supplementary Notes 1 to 3, wherein the processor is configured to:

in a case where a reliability degree of the focusing calculation by the first focusing calculation method is lower than a second threshold value, perform processing at least once of performing the focusing calculation using a second focusing calculation method with the resistance stronger than the first focusing calculation method.

Supplementary Note 5

The imaging apparatus according to Supplementary Note 4, wherein the second focusing calculation method has the focusing performance lower than the first focusing calculation method.

Supplementary Note 6

The imaging apparatus according to Supplementary Note 4 or 5, wherein the processor is configured to:

use a result of the focusing calculation by the first focusing calculation method for the focusing calculation by the second focusing calculation method.

Supplementary Note 7

The imaging apparatus according to any one of Supplementary Notes 1 to 6, wherein a determination section is included in which the focusing calculation by the plurality of focusing calculation methods is performed to determine the focusing calculation method with a relatively high reliability degree of the focusing calculation, and the processor is configured to:

select the focusing calculation method determined to have the relatively high reliability degree in the determination section.

Supplementary Note 8

The imaging apparatus according to Supplementary Note 7, wherein the determination section is an imaging section of a live view image.

Supplementary Note 9

The imaging apparatus according to Supplementary Note 7 or 8, wherein the determination section includes a fixed section starting from at least a start point in time of main imaging.

Supplementary Note 10

The imaging apparatus according to any one of Supplementary Notes 1 to 9, wherein sizes of regions, which are in the imaging element and where the signal for calculation used for the focusing calculation is acquired, are different between the plurality of focusing calculation methods.

Supplementary Note 11

The imaging apparatus according to Supplementary Note 10, wherein the focusing calculation method with a larger size of the region has stronger resistance to noise.

Supplementary Note 12

The imaging apparatus according to any one of Supplementary Notes 1 to 11, wherein frequency parameters in noise removal processing performed on the signal for calculation are different between the plurality of focusing calculation methods.

Supplementary Note 13

The imaging apparatus according to Supplementary Note 12, wherein the focusing calculation method with a lower frequency parameter has stronger resistance to noise.

Supplementary Note 14

The imaging apparatus according to any one of Supplementary Notes 1 to 13, wherein the imaging element reads out the signal for calculation prior to a signal for image generation used for generating an image.

The above various embodiments and/or various modification examples can be combined as appropriate in the technique of the present disclosure. It is needless to say that the technique of the present disclosure is not limited to each of the embodiments described above and various configurations can be employed without departing from the gist. Further, the technique of the present disclosure extends to a storage medium that stores the program non-transitorily, in addition to the program.

The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. In order to avoid complication and facilitate understanding of the portion according to the technique of the present disclosure, the description related to common general knowledge not requiring special description in order to implement the technique of the present disclosure is omitted in the above description content and illustrated content.

In the present specification, "A and/or B" is synonymous with "at least one of A or B". That is, "A and/or B" means that only A may be used, only B may be used, or a combination of A and B may be used. In the present specification, the same concept as "A and/or B" is also applied to a case where three or more matters are linked and expressed by "and/or".

All documents, patent applications, and technical standards described in the present specification are incorporated by reference in the present specification to the same extent as in a case where the incorporation of each individual document, patent application, and technical standard by reference is specifically and individually described.

What is claimed is:

1. An imaging apparatus having an automatic focus adjustment function of performing a focusing calculation of calculating a focusing position of a focus lens based on a signal for calculation read out from an imaging element, in which the focusing calculation includes a plurality of focusing calculation methods with different focusing performance and resistance to noise on the signal for calculation, the imaging apparatus comprising:

a processor, wherein the processor is configured to:

select a focusing calculation method from among the plurality of focusing calculation methods based on a result of performing the focusing calculation at least once using a first focusing calculation method which is one of the plurality of focusing calculation methods; and perform the focusing calculation using the selected focusing calculation method, wherein the first focusing calculation method is a method with the focusing performance higher than a first threshold value among the plurality of focusing calculation methods.

2. The imaging apparatus according to claim 1, wherein the first focusing calculation method is a method with highest focusing performance among the plurality of focusing calculation methods.

3. The imaging apparatus according to claim 1, wherein the processor is configured to:

in a case where a reliability degree of the focusing calculation by the first focusing calculation method is lower than a second threshold value, perform processing at least once of performing the focusing calculation using a second focusing calculation method with the resistance stronger than the first focusing calculation method.

4. The imaging apparatus according to claim 3, wherein the second focusing calculation method has the focusing performance lower than the first focusing calculation method.

5. The imaging apparatus according to claim 3, wherein the processor is configured to:

use a result of the focusing calculation by the first focusing calculation method for the focusing calculation by the second focusing calculation method.

6. The imaging apparatus according to claim 1, wherein a determination section is included in which the focusing calculation by the plurality of focusing calculation methods is performed to determine the focusing calculation method with a relatively high reliability degree of the focusing calculation, and the processor is configured to:

select the focusing calculation method determined to have the relatively high reliability degree in the determination section.

7. The imaging apparatus according to claim 6, wherein the determination section is an imaging section of a live view image.

8. The imaging apparatus according to claim 6, wherein the determination section includes a fixed section starting from at least a start point in time of main imaging.

9. The imaging apparatus according to claim 1, wherein sizes of regions, which are in the imaging element and where the signal for calculation used for the focusing calculation is acquired, are different between the plurality of focusing calculation methods.

10. The imaging apparatus according to claim 9, wherein the focusing calculation method with a larger size of the region has stronger resistance to noise.

11. The imaging apparatus according to claim 1, wherein frequency parameters in noise removal processing performed on the signal for calculation are different between the plurality of focusing calculation methods.

12. The imaging apparatus according to claim 11, wherein the focusing calculation method with a lower frequency parameter has stronger resistance to noise.

13. The imaging apparatus according to claim 1, wherein the imaging element reads out the signal for calculation prior to a signal for image generation used for generating an image.

14. An operation method of an imaging apparatus having an automatic focus adjustment function of performing a focusing calculation of calculating a focusing position of a focus lens based on a signal for calculation read out from an imaging element, in which the focusing calculation includes a plurality of focusing calculation methods with different focusing performance and resistance to noise on the signal for calculation, the operation method comprising:

selecting a focusing calculation method from among the plurality of focusing calculation methods based on a result of performing the focusing calculation at least once using a first focusing calculation method which is one of the plurality of focusing calculation methods; and performing the focusing calculation using the selected focusing calculation method, wherein the first focusing calculation method is a method with the focusing performance higher than a first threshold value among the plurality of focusing calculation methods.

15. A non-transitory computer-readable storage medium storing an operation program of an imaging apparatus having an automatic focus adjustment function of performing a focusing calculation of calculating a focusing position of a focus lens based on a signal for calculation read out from an imaging element, in which the focusing calculation includes a plurality of focusing calculation methods with different focusing performance and resistance to noise on the signal for calculation, the operation program causing a computer to execute a process comprising:

selecting a focusing calculation method from among the plurality of focusing calculation methods based on a result of performing the focusing calculation at least once using a first focusing calculation method which is one of the plurality of focusing calculation methods; and performing the focusing calculation using the selected focusing calculation method, wherein the first focusing calculation method is a method with the focusing performance higher than a first threshold value among the plurality of focusing calculation methods.

* * * * *